(12) United States Patent
Madison et al.

(10) Patent No.: US 12,702,081 B2
(45) Date of Patent: Aug. 11, 2026

(54) SYSTEMS AND METHODS FOR APPLYING FLUID TO GROUPS OF SEEDS DISPENSED FROM A PLANTER

(71) Applicant: Capstan Ag Systems, Inc., Topeka, KS (US)

(72) Inventors: Adam Madison, Lancaster, KS (US); Michael Schwegman, Topeka, KS (US); Anthony Moeder, Topeka, KS (US)

(73) Assignee: Capstan Ag Systems, Inc., Topeka, KS (US)

( * ) Notice: Subject to any disclaimer, the term of this patent is extended or adjusted under 35 U.S.C. 154(b) by 714 days.

(21) Appl. No.: 18/114,568

(22) Filed: Feb. 27, 2023

(65) Prior Publication Data

US 2023/0210042 A1 Jul. 6, 2023

Related U.S. Application Data

(63) Continuation of application No. 16/790,321, filed on Feb. 13, 2020, now Pat. No. 11,589,498.

(Continued)

(51) Int. Cl.

*A01C 7/06* (2006.01)
*A01C 7/10* (2006.01)

(Continued)

(52) U.S. Cl.

CPC ................ *A01C 7/06* (2013.01); *A01C 7/105* (2013.01); *A01C 7/18* (2013.01); *A01C 23/007* (2013.01)

(58) Field of Classification Search

CPC .. A01C 7/06; A01C 7/18; A01C 7/105; A01C 23/007

See application file for complete search history.

(56) References Cited

U.S. PATENT DOCUMENTS 3,038,425 A 6/1962 Hansen
3,322,080 A 5/1967 Gatzke et al.

(Continued)

OTHER PUBLICATIONS

Curley et al., "Planter Attachment for the Spot Application of Soil Anticrustant", 1991 International Summer Meeting sponsored by the America Society of Agricultural Engineers, Jun. 23-26, 1991, pp. 1-11.

(Continued)

*Primary Examiner* — Joseph C Rodriguez
(74) *Attorney, Agent, or Firm* — Armstrong Teasdale LLP

(57) ABSTRACT

A planter system includes a seeder assembly including a seed meter configured to dispense groups of seeds at intervals through a seed tube. The planter system also includes a sensor configured to transmit a first detection signal upon detection of a first seed passing through the seed tube and a second detection signal upon detection of a second seed passing through the seed tube. A control system is configured to compare a time between the first and second detection signals to a threshold time; determine that the first seed and the second seed are in a single group of seeds when the time between the first and second detection signals is less than the threshold time; and determine that the first seed and the second seed are in different groups of seeds if the time between the first and second detection signals is greater than the threshold time.

20 Claims, 9 Drawing Sheets

Related U.S. Application Data

(60) Provisional application No. 62/805,178, filed on Feb. 13, 2019.

(51) Int. Cl.
*A01C 7/18* (2006.01)
*A01C 23/00* (2006.01)

(56) References Cited

U.S. PATENT DOCUMENTS

| | | | | |
|---|---|---|---|---|
| 3,373,705 | A | 3/1968 | Hansen et al. | |
| 3,450,074 | A | 6/1969 | Gatzke et al. | |
| 3,653,550 | A | 4/1972 | Williams | |
| 4,220,998 | A | 9/1980 | Kays | |
| RE31,023 | E | 9/1982 | Hall, III | |
| 4,448,820 | A | 5/1984 | Buschor | |
| 4,561,565 | A | 12/1985 | Wolf et al. | |
| 4,765,263 | A | 8/1988 | Wilkins | |
| 4,915,258 | A | 4/1990 | Olson | |
| 5,024,173 | A | 6/1991 | Deckler | |
| 5,134,961 | A | 8/1992 | Giles et al. | |
| 5,170,909 | A | 12/1992 | Lundie et al. | |
| 5,379,812 | A | 1/1995 | McCunn et al. | |
| 5,475,614 | A | 12/1995 | Tofte et al. | |
| 5,632,212 | A | 5/1997 | Barry | |
| 5,650,609 | A | 7/1997 | Mertins et al. | |
| 5,653,389 | A | 8/1997 | Henderson et al. | |
| 5,704,546 | A | 1/1998 | Henderson et al. | |
| 5,744,793 | A | 4/1998 | Skell et al. | |
| 5,847,389 | A | 12/1998 | Mertins et al. | |
| 5,848,571 | A | 12/1998 | Stufflebeam et al. | |
| 5,924,371 | A | 7/1999 | Flamme et al. | |
| 6,047,652 | A | 4/2000 | Prairie et al. | |
| 6,070,539 | A | 6/2000 | Flamme et al. | |
| 6,081,224 | A | 6/2000 | Rosenbrock | |
| 6,216,615 | B1 | 4/2001 | Romans | |
| 6,273,010 | B1 | 8/2001 | Luxon | |
| 6,289,829 | B1 | 9/2001 | Fish et al. | |
| 6,453,832 | B1 | 9/2002 | Schaffert | |
| 6,477,967 | B2 | 11/2002 | Rosenboom | |
| 6,481,647 | B1 | 11/2002 | Keaton et al. | |
| 6,516,733 | B1 | 2/2003 | Sauder et al. | |
| 6,763,773 | B2 | 7/2004 | Schaffert | |
| 6,834,749 | B1 | 12/2004 | Johnson | |
| 6,938,564 | B2 * | 9/2005 | Conrad | A01C 7/06 111/170 |
| 7,270,065 | B2 * | 9/2007 | Conrad | A01C 7/06 111/900 |
| 7,273,016 | B2 | 9/2007 | Andphair et al. | |
| 7,370,589 | B2 | 5/2008 | Wilkerson et al. | |
| 7,717,048 | B2 | 5/2010 | Peterson, Jr. et al. | |
| 7,868,242 | B2 | 1/2011 | Takahashi | |
| 8,074,585 | B2 | 12/2011 | Wilkerson et al. | |
| 8,191,795 | B2 | 6/2012 | Grimm et al. | |
| 8,523,085 | B2 | 9/2013 | Grimm et al. | |
| 9,226,442 | B2 | 1/2016 | Grimm et al. | |
| 9,629,313 | B1 | 4/2017 | Grossman | |
| 10,470,356 | B2 * | 11/2019 | Rice | A01M 7/0092 |
| 10,785,905 | B2 * | 9/2020 | Stoller | A01C 5/068 |
| 11,058,046 | B2 * | 7/2021 | Conrad | A01C 23/028 |
| 11,252,857 | B2 * | 2/2022 | Ritland | A01C 7/06 |
| 11,533,837 | B2 * | 12/2022 | Madison | A01C 23/047 |
| 11,589,498 | B2 * | 2/2023 | Madison | A01C 7/18 |
| 11,864,487 | B2 * | 1/2024 | Schlipf | A01C 21/005 |
| 12,017,239 | B2 * | 6/2024 | Grimm | A01C 7/06 |
| 2006/0273189 | A1 | 12/2006 | Grimm et al. | |
| 2007/0193482 | A1 | 8/2007 | Spooner | |
| 2012/0228395 | A1 | 9/2012 | Needham et al. | |
| 2013/0269578 | A1 | 10/2013 | Grimm et al. | |
| 2014/0299673 | A1 | 10/2014 | Grimm et al. | |
| 2016/0015020 | A1 | 1/2016 | Needham et al. | |
| 2016/0073576 | A1 | 3/2016 | Grimm et al. | |
| 2017/0049044 | A1 * | 2/2017 | Stoller | A01C 7/201 |
| 2018/0359909 | A1 | 12/2018 | Conrad et al. | |

OTHER PUBLICATIONS

Ghidiu et al., "A New Method of Soil Application of Aldicarb", Journal of Production Agriculture, 1995, pp. 43-45, 8(1).

Hancock, "Design and Evaluation of a Seed-Specific Applicator for In-Furrow Chemical Application", A Thesis Presented for the Master of Science Degree, the University of Tennessee, Knoxville, May 2003, pp. 1-151.

Lohmeyer at al., "Precision Application of Aldicarb to Enhance Efficiency of Thrips (*Thysanoptera: thripidae*) Management in Cotton", Journal of Economic Entomology, Jun. 2003, pp. 748-754, 96(3).

* cited by examiner

SYSTEMS AND METHODS FOR APPLYING FLUID TO GROUPS OF SEEDS DISPENSED FROM A PLANTER

CROSS-REFERENCE TO RELATED APPLICATIONS

This application is a continuation of U.S. patent application Ser. No. 16/790,321, filed on Feb. 13, 2020, which claims priority to U.S. Provisional Patent Application Ser. No. 62/805,178, filed on Feb. 13, 2019, the disclosures of which are hereby incorporated by reference in their entirety.

BACKGROUND

The field of this disclosure relates generally to systems for applying fluid to agricultural fields and, more particularly, to systems and methods for applying fluid to groups of seeds dispensed from a planter.

In the agricultural industry, agricultural fluids are commonly applied to fields for a variety of reasons. For example, plants and plant precursors (e.g., seeds) are often sprayed with an agricultural fluid at the time of planting to enhance germination and early development. Agricultural fluids include, without limitation, spray fertilizers, pesticides, insecticides, fungicides, growth promoter, and/or growth regulator.

To simplify this process, various fluid application systems have been developed that are designed to apply a fluid onto seeds as they are planted or otherwise distributed on and/or within the ground. However, such conventional fluid application systems are typically configured to dispense a continuous band of fluid down the length of the row in which the seeds are being planted. To avoid the problems associated with continuous band fluid application systems, improved fluid application systems have been developed that provide for seed-specific placement of agricultural fluids. For example, U.S. Pat. Nos. 7,370,589 and 8,074,585 (Wilkerson et al.), both of which are hereby incorporated by reference herein in their entirety for all purposes, disclose a system that utilizes a sensor to detect seeds passing through a seed tube. Upon the detection of a seed, the sensor transmits information to a controller configured to control the operation of a fluid dispenser such that the fluid dispenser dispenses fluid onto the seed at a predetermined time after the seed is detected by the sensor.

Sometimes it may be desirable to dispense seeds in groups such that the group of seeds are positioned in the same area and the plants may break through the ground together after the seeds are germinated. Such grouped planting of seeds is commonly referred to as “hilldrop” planting. Sometimes the groups of seeds are sprayed with fluid as the seeds are being planted. To avoid the problems associated with continuous band fluid application systems, it would be desirable to provide controlled placement of the agricultural fluid relative to each group of seeds. However, systems that provide for seed-specific placement of agricultural fluids are typically configured to detect and apply fluid to individual seeds.

BRIEF SUMMARY

In one aspect, a planter system for planting seeds and applying a fluid includes a seeder assembly including a seed meter configured to dispense groups of seeds at intervals through a seed tube. The planter system also includes a sensor configured to transmit a first detection signal upon detection of a first seed passing through the seed tube and a second detection signal upon detection of a second seed passing through the seed tube, and a control system communicatively coupled to the sensor to receive the detection signals from the sensor. The control system is configured to compare a time between the first and second detection signals to a threshold time; determine that the first seed and the second seed are in a single group of seeds when the time between the first and second detection signals is less than the threshold time; and determine that the first seed and the second seed are in different groups of seeds if the time between the first and second detection signals is greater than the threshold time.

In another aspect, a method for planting seeds including dispensing seeds at intervals through a seed tube using a seed meter; detecting, by a sensor, each seed passing through the seed tube; transmitting a first detection signal to a control system communicatively coupled to the sensor upon detecting, via the sensor, a first seed passing through the seed tube; transmitting a second detection signal to the control system upon detecting, via the sensor, a second seed passing through the seed tube; and comparing, by the control system, a time between the first and second detection signals to a threshold time. The method also includes determining, by the control system, that the first seed and the second seed are in a single group of seeds when the time between the first and second detection signals is less than the threshold time; and determining, by the control system, that the first seed and the second seed are in different groups of seeds when the time between the first and second detection signals is greater than the threshold time.

In yet another aspect, a control system for a planter system for planting seeds includes at least one processor and memory. The memory has computer-executable instructions embodied thereon, which, when executed by the at least one processor, cause the control system to receive a first detection signal from a sensor upon detection of a first seed passing through a seed tube; receive a second detection signal from the sensor upon detection of a second seed passing through the seed tube; compare a time between the first and second detection signals to a threshold time; determine that the first seed and the second seed are in a single group of seeds if the time between the first and second detection signals is less than the threshold time; and determine that the first seed and the second seed are in different groups of seeds when the time between the first and second detection signals is greater than the threshold time.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION OF THE DRAWINGS

Figure 1:
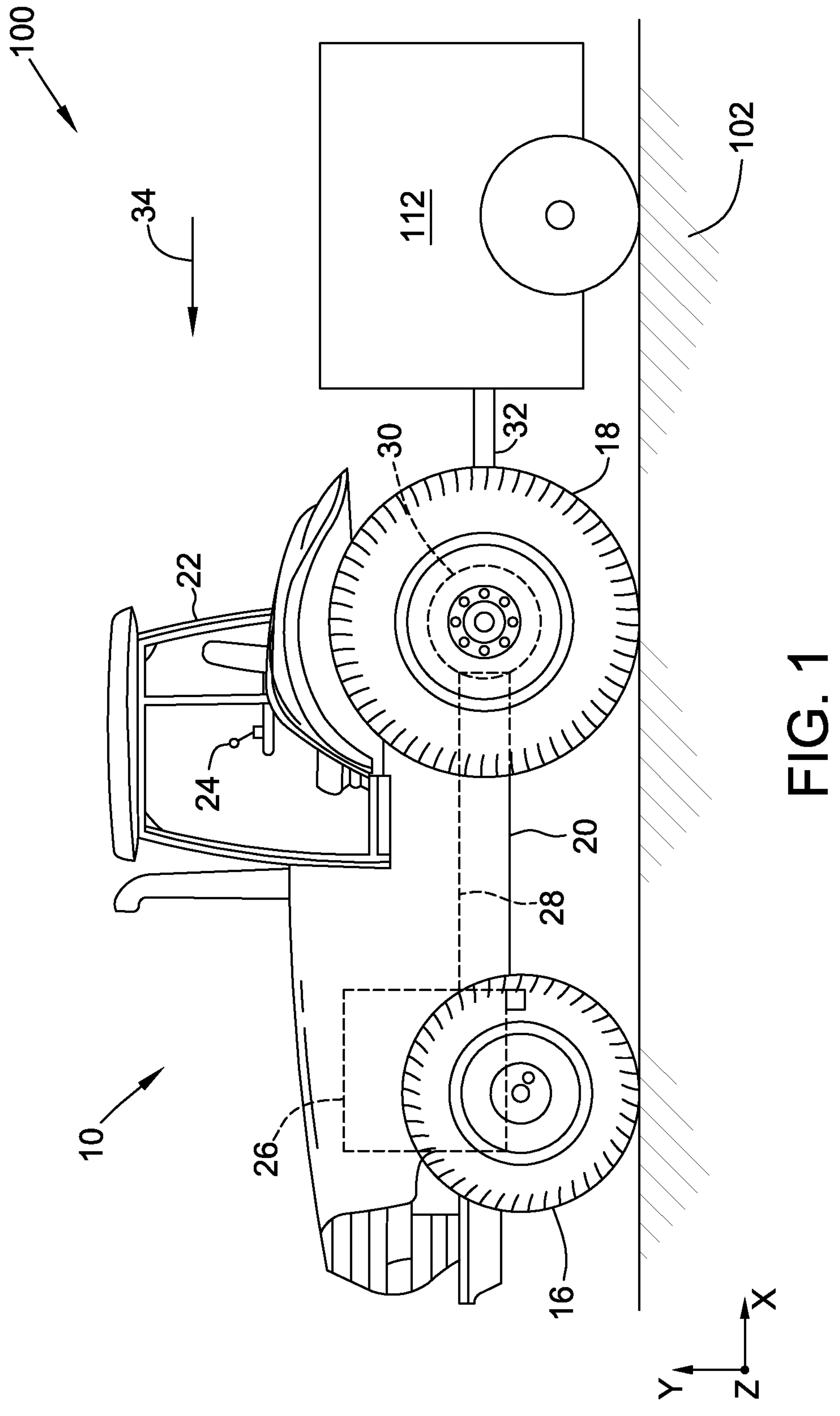
FIG. 1 is a side schematic view of an embodiment of a seed planting and agricultural fluid application system connected to a motorized vehicle.

Referring now to FIG. 1, a seed planting and agricultural fluid application system, or planter, 112 (shown schematically in FIG. 1) is shown connected to a motorized vehicle 10. Motorized vehicle 10 is coupled, fixedly or removably, to seed planting and agricultural fluid application system 112 and provides locomotion to seed planting and agricultural fluid application system 112 and/or otherwise controls components of seed planting and agricultural fluid application system 112. In the illustrated embodiment, motorized vehicle 10 is a tractor, although any other suitable vehicles or machines may be used to provide locomotion to seed planting and agricultural fluid application system 112 and provide for control of seed planting and agricultural fluid application system 112. In some embodiments, one or more components of seed planting and agricultural fluid application system 112 may be incorporated into motorized vehicle 10 without departing from some aspects of this disclosure.

As shown in FIG. 1, motorized vehicle 10 includes a pair of front wheels 16, a pair or rear wheels 18, and a chassis 20 coupled to and supported by wheels 16, 18. A cab 22 is supported by a portion of chassis 20 and houses various control devices 24 for permitting an operator to control operation of motorized vehicle 10. In some embodiments, control devices 24 may also permit control of seed planting and agricultural fluid application system 112. Motorized vehicle 10 also includes an engine 26 and a transmission 28 mounted on chassis 20. Transmission 28 is operably coupled to engine 26 and provides variably adjusted gear ratios for transferring engine power to wheels 18 via an axle/differential 30. Additionally, as shown in FIG. 1, motorized vehicle 10 may be configured to be coupled to seed planting and agricultural fluid application system 112 via a suitable coupling 32 such that vehicle 10 may pull seed planting and agricultural fluid application system 112 as it moves in a travel direction (indicated by arrow 34) along a field 102. It should be understood that any other suitable vehicle or machine may be used to provide locomotion to seed planting and agricultural fluid application system 112 and provide for control of seed planting and agricultural fluid application system 112. In some embodiments, for example, vehicle 10 may include tracks instead of or in addition to front wheels 16 and/or wheels 18. Additionally, in some embodiments, vehicle 10 may be an autonomous vehicle with or without a cab 22.

Figure 2:
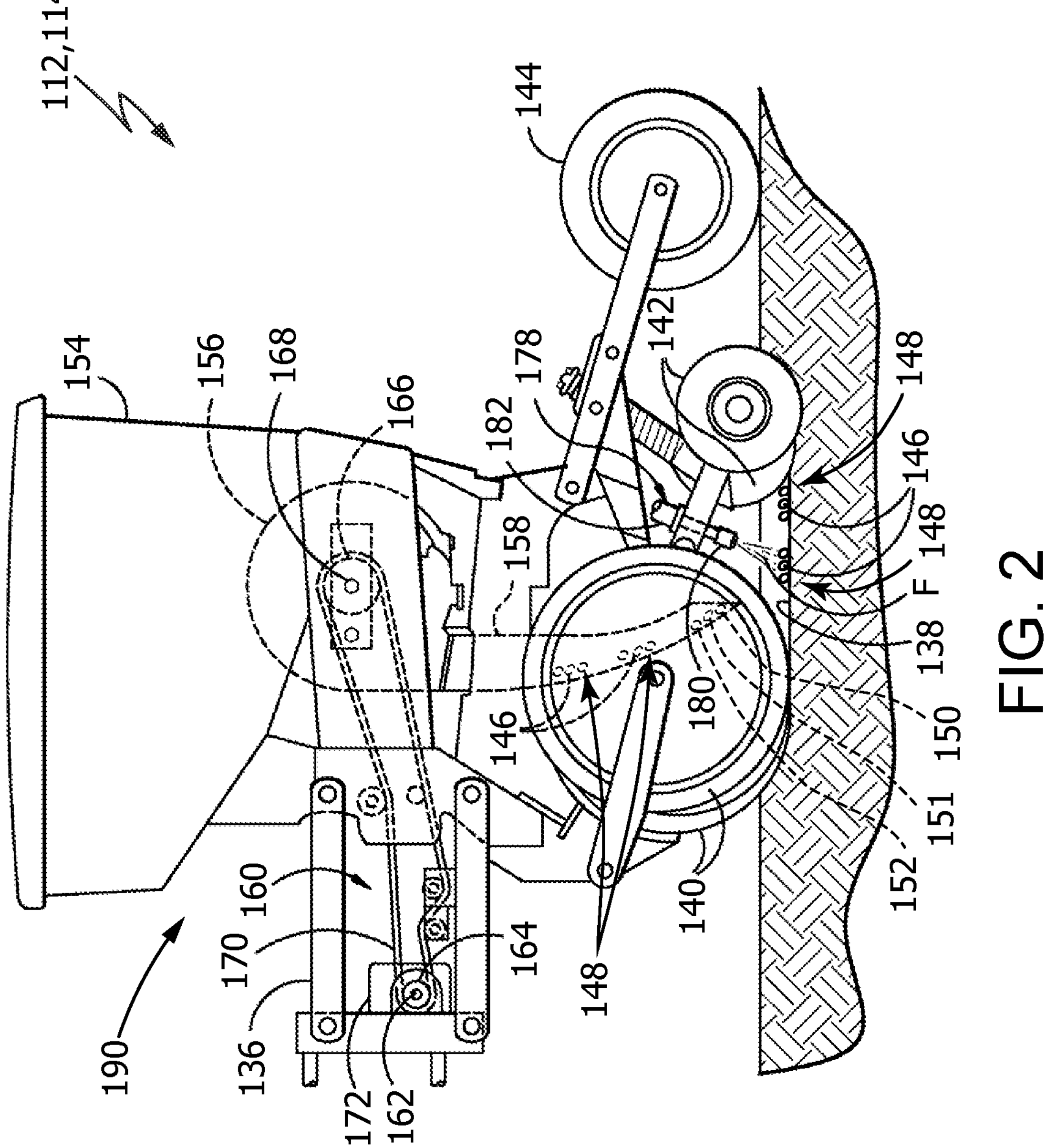
FIG. 2 is a side view of a portion of the seed planting and agricultural fluid application system shown in FIG. 1.

Referring to FIG. 2, seed planting and agricultural fluid application system includes a plurality of row units 114. Row units 114 are configured to at least apply a fluid on and/or adjacent to seeds and/or plants and, in some embodiments, are configured to plant seeds and apply the fluid on and/or adjacent to the seeds. Seed planting and agricultural fluid application system 112 further includes a control system and a user interface (shown in FIGS. 4 and 5) for controlling row units 114 and displaying related information. The control system and user interface determine a fluid band length and a position of the fluid band relative to a seed, group of seeds, or plant, and convey this information to an operator of the seed planting and agricultural fluid application system. The control system and user interface are located in a cab or other occupant space (e.g., cab 22) for the operator of seed planting and agricultural fluid application system 112. In alternative embodiments, the control system and/or user interface are located remote from row units 114 and an associated vehicle and allow for remote control of row units 114.

Row unit 114 is configured to create a furrow 138 using a furrow creation device, to meter and dispense seeds into furrow 138 from a seed hopper 154 using a seed tube 158, and to dispense a fluid F using a nozzle assembly 178. Row unit 114 may include any number of components such that row unit 114 performs these functions for a single row or a plurality of rows simultaneously. For example, in some embodiments, row unit 114 includes a plurality of furrow creation devices, seed tubes 158 fed from seed hoppers 154 (e.g., each seed hopper 154 fed from a single, shared master seed hopper, not shown), and nozzle assemblies 178 along the track of row unit 114 and planter 112. Planter 112 includes a frame 136 extending along the width of the planter 112 (e.g., in a direction transverse to the travel of planter 112, in other words parallel to the track length of planter 112) that supports row units 114.

The furrow creation device of planter 112 is configured to create a trench or furrow 138 within the ground for planting seeds 146. In several embodiments, the furrow creation device includes a pair of laterally spaced opening discs 140, a pair of laterally spaced closing discs 142 and a press wheel 144. Opening discs 140 are configured to open a furrow 138 within the ground. Seeds 146 are deposited in groups 148 into furrow 138 (e.g., by seed tube 158), and closing discs 142 are configured to close furrow 138 over seeds 146. Press wheel 144 is configured to compact the soil that has been closed over seeds 146. In alternative embodiments, furrow creation device may include other suitable components for creating furrow 138. In further alternative embodiments, planter 112 does not include a furrow creation device but rather plants and/or dispenses fluid in an existing furrow 138 (e.g., created by another machine). In some embodiments, planter 112 applies fluid on top of the ground outside of a furrow. For example, planter 112 may dispense fluid from a front end of planter 112 in the travel direction and/or planter 112 may apply fluid to the ground at a specified distance from a furrow.

Row unit 114 includes a seeder assembly 190 including seed hopper 154, a seed meter 156, and seed tube 158. As used herein, the term "seed tube" refers to an enclosure through which seeds are delivered or conveyed to a furrow, and may be a gravity fed seed tube and/or may include one or more elements for actively delivering seeds to the furrow, such as a rotating belt or brush. Seed hopper 154, seed meter 156, and seed tube 158 are configured to dispense seeds 146 into furrow 138 in groups 148. For example, seed hopper 154 is any suitable container or other storage device configured for storing and dispensing seeds 146 into seed meter 156. Seed meter 156 is any suitable seed meter configured to dispense seeds 146 into seed tube 158 at a metered rate. In one embodiment, seed meter 156 includes a housing and a seed plate or disc rotatably supported within the housing. The seed disc includes a plurality of indentions, channels and/or other suitable recessed features that are spaced apart from one another around the seed disc (e.g., in a circular array) to allow seeds 146 to be dispensed at a given frequency. Specifically, each recessed feature is configured to grab one seed 146 (e.g., via a vacuum applied to the recessed feature) as such recessed feature is rotated past the location at which seeds 146 are fed into the housing from seed hopper 154. As the seed disc is rotated, seeds 146 are carried by the recessed features and dispensed into seed tube 158 in groups 148. The metered rate may be predetermined, set, changed, or otherwise controlled (e.g., by the control system of planter 112 or mechanically based on a rate of travel of row unit 114). For example, at a given rotational speed for the seed disc, the seed meter 156 dispenses groups 148 of seeds 146 at a constant frequency. When planter 112 travels at a constant speed, groups 148 of seeds 146 are spaced apart equally from one another within furrow 138. As the travel speed of the planter 112 increases or decreases, the rotational speed of the seed disc must also be increased or decreased to maintain equal spacing or a predetermined spacing of groups of seeds 146 within the furrow 138. Such variation of the rotational speed of the seed disc is provided by a drive system 160 and/or controlled by a control system of planter 112.

Seeds 146 are dispensed from seed tube 158 into furrow 138 in groups, also referred to as hills, 148. Accordingly, planter 112 is configured as a hilldrop planter. In the illustrated embodiment, each group 148 includes a first seed 150, a middle seed 151, and a last seed 152. First seed 150 passes through seed tube 158 first and is dispensed to furrow 138 before the other seeds 146 in group 148. Last seed 152 passes through seed tube 158 last and is dispensed to furrow 138 after the other seeds 146 in group 148. Middle seed 151 passes through seed tube 158 between first seed 150 and last seed 152 and is dispensed to furrow 138 after first seed 150 and before last seed 152. Accordingly, seeds 146 are arranged in furrow 138 chronologically, i.e., first, middle, last, along the direction of travel of planter 112. In alternative embodiments, each group 148 may include two seeds 146. In further embodiments, each group 148 may include four or more seeds 146. In embodiments including four or more seeds 146, each seed 146 between first seed 150 and last seed 152 is considered a middle seed 151.

Drive system 160 is or includes any suitable device and/or combination of devices configured to rotate the seed disc of seed meter 156. In the illustrated embodiment, for example, drive system 160 is a sprocket/chain arrangement including a drive shaft 162, a first sprocket 164 coupled to drive shaft 162, a second sprocket 166 coupled to the seed disc (e.g., via a shaft 168) and a chain 170 coupled between the first and second sprockets 164, 166. Drive shaft 162 is configured to rotate first sprocket 164, which, in turn, rotates second sprocket 166 via chain 170. Rotation of second sprocket 166 results in rotation of shaft 168 and, thus, rotation of the seed disc within the housing of seed meter 156. Drive system 160 further includes a motor 172 (e.g., an electric or hydraulic motor) rotatably coupled to drive shaft 162 that is configured to be controlled by the control system of planter 112. Specifically, the control system is configured to receive signals associated with the travel speed of planter 112 from a sensor or other suitable device (e.g., an encoder or shaft sensor, global positioning system receiver, or other device) and regulate the rotational speed of motor 172 based on the travel speed of planter 112 such that a desired spacing between seeds and/or groups of seeds is achieved or maintained. In alternative embodiments, drive system 160 is or includes other components or devices. For example, drive system 160 may be configured to rotate the seed disc using a connection with one or more wheels or other rotating features of planter 112. A transmission, clutch, and/or other components may be used to regulate the rotational speed of the seed disc and therefore achieve or maintain desired spacing between seeds and/or groups of seeds.

In alternative embodiments, row unit 114 is or includes other suitable components for dispensing seeds 146. In further alternative embodiments, planter 112 does not include seed hopper 154, seed meter 156, seed tube 158, or other components for dispensing seeds 146, and instead applies fluid to existing seeds 146 or existing plants. In such embodiments, row unit 114 does not include seeder assembly 190.

Row unit 114 further includes at least one nozzle assembly 178 configured to dispense fluid F. Nozzle assembly 178 dispenses fluid F, or a combination of fluids, on, adjacent to, or otherwise in relation to seeds 146 dispensed by seed tube 158 or existing plants. Nozzle assembly 178 includes a nozzle 180 and a valve 182 (e.g., a solenoid valve). Nozzle 180 is any suitable nozzle suitable for an agricultural fluid application system. Valve 182 is configured to be mounted to and/or integrated within a portion of nozzle 180 or nozzle assembly 178 using any suitable mounting configuration and/or any other suitable configuration that permits control of the flow of fluid F through the nozzle 180. For example, valve 182 is a solenoid valve positioned relative to nozzle 180 and controlled by the control system of planter 112 such that flow of fluid F through nozzle 180 is modified using pulse width modulation (PWM) control of valve 182. In other embodiments, valve 182 may be located remote from nozzle 180. In some embodiments, for example, valve 182 may be mounted or coupled to the manifold used to supply fluid to nozzle assemblies 178. In some embodiments, nozzle assembly 178 also includes a tip 234 (shown in FIG. 3) coupled to nozzle 180 and configured to produce a desired spray pattern.

Fluid F is supplied to nozzle assembly 178 from any suitable fluid source (not shown), such as a fluid tank, via a pipe such as a manifold or other suitable flow conduit. In addition, a pump (not shown), such as a centrifugal pump, may be positioned upstream of nozzle assembly 178 for pumping fluid F from the fluid source to the nozzle assembly 178. Alternatively, the pump may be positioned between a fluid reservoir and a manifold which is in fluid communication with a plurality of nozzle assemblies 178. The pump pressurizes the manifold with fluid from the reservoir and nozzle assembly 178 and/or valves 182 controls flow of the pressurized fluid through nozzle 180. In some embodiments, row unit 114 includes a plurality of nozzle assemblies 178 for dispensing fluid in parallel rows. In further embodiments, a single nozzle assembly 178 is configured to dispense fluid in two or more parallel rows. In still further embodiments, row unit 114 includes a plurality of nozzle assemblies 178 positioned to dispense fluid in a single row (e.g., furrow). For example, each nozzle assembly 178 may dispense a different fluid and may be controlled, by the control system of planter 112, together or individually (e.g., allowing for different fluid band lengths and/or offset distances from seeds 146 or groups 148 of seeds Referring now to FIG. 3, seed planting and agricultural fluid application system 112 further includes a fluid dispensing assembly 210 that includes a manifold 236 (e.g., a boom pipe) which supplies fluid F and/or other fluids to nozzle assembly 178. Manifold 236 is coupled to a pump and/or fluid reservoir and is pressurized (e.g., by the pump). Manifold 236 is coupled to nozzle assembly 178 by a suitable fluid conduit 228, such as a pipe or hose. Valve 182 of nozzle assembly 178 controls the flow of fluid F from fluid conduit 228 to nozzle 180 and tip 234 as described herein. For example, a controller 222 and/or the control system of planter 112 sends a pulse width modulated signal to a solenoid valve 182 to control flow of fluid F to nozzle 180. Tip 234 is configured to produce a specified spray pattern. The spray pattern may be pressure dependent. Controller 222 and/or the control system may be configured to control the pressure in manifold 236 to achieve a desired spray pattern in combination with tip 234. In some embodiments, tip 234 is interchangeable with other tips configured to produce varying spray patterns. The type of tip 234 and/or parameters describing the spray pattern produced by tip 234 may be entered into controller 222 and/or the control system by an operator via a user interface, for example, using a tip calibration screen (shown in FIG. 7). Other operating parameters, such as fluid flow rate, fluid pressure, seed population, number of seeds 146 per group 148, and speed or velocity of the planter 112 or row unit 114, may be determined by and/or input to controller 222 and/or the control system (e.g., by an operator using a user interface). Controller 222 and/or the control system may use this information in determining fluid band length of fluid F and/or the offset of the fluid band from seeds 146 or groups 148 of seeds 146. Fluid band length refers to the length of the fluid band, measured in the direction of travel of row unit 114 and planter 112, discharged or dispensed by nozzle assembly 178 during a single on-cycle of valve 182.

Figure 3:
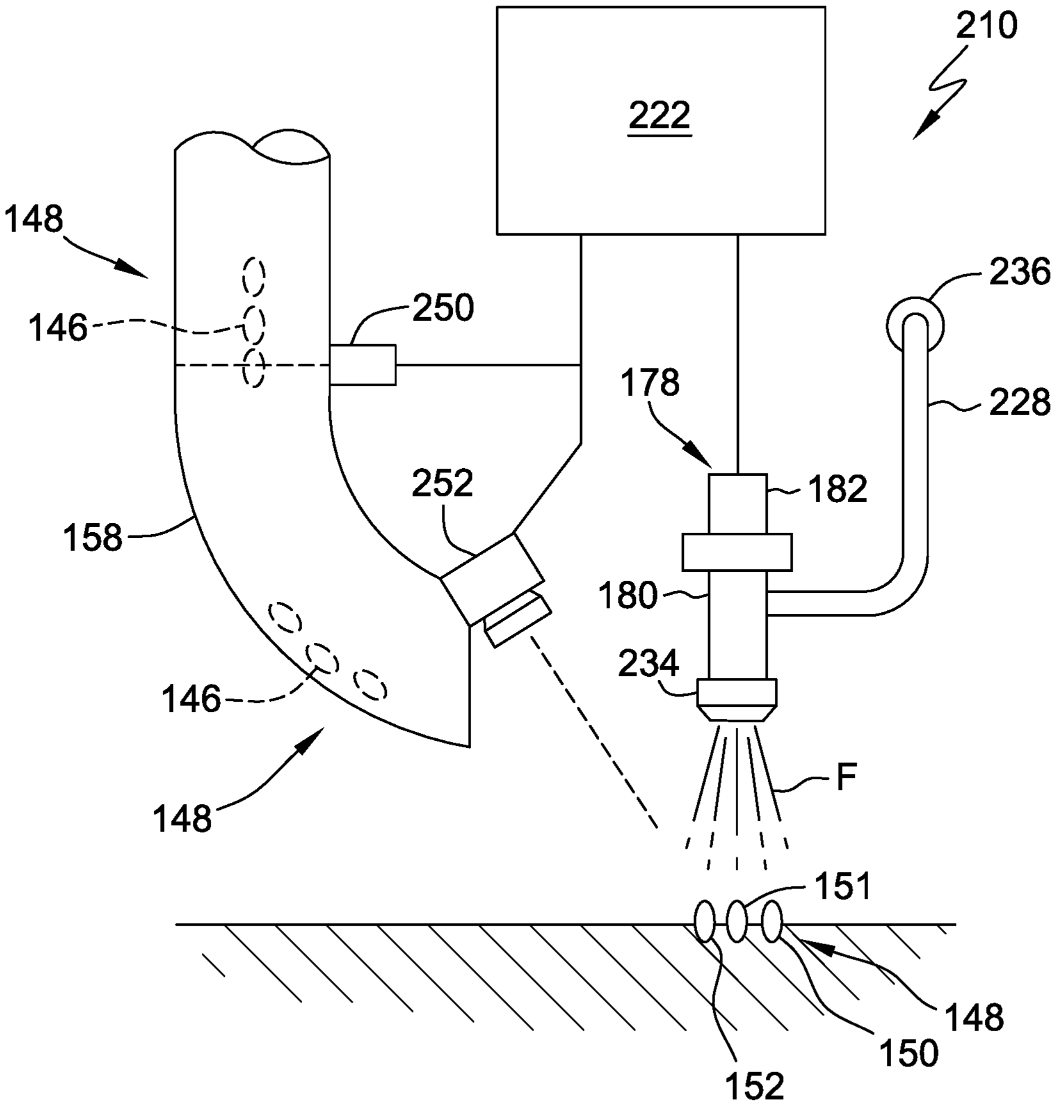
FIG. 3 is schematic view of a portion of the seed planting and agricultural fluid application system shown in FIGS. 1 and 2.

Still referring to FIG. 3, in some embodiments, fluid dispensing assembly 210, including nozzle assembly 178, is configured to apply fluid F on and/or adjacent to seed 146 or group 148 of seeds 146 using, in part, one or more sensors. In the illustrated embodiment, for example, fluid dispensing assembly 210 includes a seed sensor 250. Seed sensor 250 is configured to sense when seed 146 enters, passes through, and/or exits seed tube 158. For example, sensor 250 may be an optical sensor (e.g., a camera) or a beam break sensor (e.g., infrared beam break sensor) producing a beam which when broken sends a signal (e.g., a change in voltage). Seed sensor 250 may be a mechanical sensor which at least partially obstructs seed tube 158 and that produces a signal (e.g., change in voltage) when seed 146 contacts or moves the mechanical sensor. In alternative embodiments, other suitable sensor(s) are used to detect when seed 146 enters and/or exits seed tube 158. In further embodiments, sensor 250 is configured to determine a location of seed 146 or group 148 of seeds 146 in furrow 38. For example, sensor 250 may be or include a camera which images seed 146 or group 148 of seeds 146 in furrow 38. Additionally or alternatively, fluid dispensing assembly 210 may include a second sensor, such as a camera 252, configured to capture one or more images of each seed 146 or group of seeds 146 after it is dispensed from seed tube 158 and/or as fluid is applied to it by the nozzle assembly(ies) 178. Additional details and operation of seed sensor 250 and camera 252 are described in U.S. Pat. No. 9,763,381, the disclosure of which is hereby incorporated by reference in its entirety. Using image recognition techniques, distance calculating techniques, and/or a time when seed 146 leaves seed tube 158, the location of seed 146 or group 148 of seeds 146 may be determined. Sensor(s) 250, 252 may send a signal to a controller 222 and/or a control system (shown in FIG. 5) of planter 112 for use in controlling fluid dispensing assembly 210, such as when to actuate valve 182 on nozzle assembly 178.

Controller 222 and/or the control system of planter 112 uses information received from sensor(s) 250, 252 to control fluid dispensing assembly 210. Controller 222 and/or the control system of planter 112 controls nozzle assembly 178 to apply fluid F on or adjacent to seed 146.

Controller 222 and/or the control system of planter 112 may be configured to determine when to open and close valve 182 by analyzing various operating parameters of planter 112, which may be pre-stored within the controller's memory and/or received by the controller 222 and/or control system as an input. For example, operating parameters may include, but are not limited to, the vertical distance from the top of seed tube 158 to furrow 138, the vertical distance each seed 146 falls between the sensor 250 and the furrow 138, the vertical distance between an outlet of nozzle assembly 178 (e.g., tip 234, if connected) and furrow 138, a horizontal distance between an outlet of seed tube 158 and an outlet of nozzle assembly 178, an angle at which nozzle assembly 178 is oriented relative to field 102, the speed of row unit 114, the number of seeds 146 in each group 148, and/or any other suitable operating parameters. Based on such analysis, controller 222 and/or the control system may be configured to calculate a suitable time delay for actuating valve 182 (e.g., the amount of time between when the sensor 250 detects a seed 146 and when valve 182 is opened to apply fluid F on and/or adjacent to each seed 146 or group 148 of seeds 146).

Controller 222 and/or the control system of planter 112 may also or alternatively be configured to control the operation of valve 182 such that a specific volume of fluid F is applied on and/or adjacent to each seed 146 or group 148 of seeds 146. Controller 222 and/or the control system may be configured to analyze one or more operating parameters in order to determine the duration of a valve pulse (e.g., the amount of time valve 182 is opened) to achieve a desired application volume for each seed 146 or group 148 of seeds 146. Such operating parameters may include, but are not limited to, the pressure of the fluid F supplied to valve 182, the configuration of valve 182 (e.g., the sizes of the inlet and/or outlet of the valve 182), the configuration of nozzle assembly 178 (e.g., tip 234 orifice size), the speed V of row unit 114 and/or any other suitable operating parameters. Controller 222 and/or the control system may be configured to control the duration of the valve pulse in a manner that allows the same volume of fluid F to be applied on and/or adjacent to each seed 146 or group 148 of seeds 146. Alternatively, controller 222 and/or the control system may be configured to implement a fixed application approach, wherein valve 182 is operated at a constant pulse duration. In such an embodiment, the specific volume of fluid F applied on and/or adjacent to each seed 146 may generally vary depending on the speed V of row unit 114 and/or the pressure of the fluid F supplied to valve 182.

Controller 222 and/or the control system of planter 112 may also or alternatively be configured to control the operation of valve 182 such that fluid F is applied beginning at a specific offset distance from seed 146, group 148 of seeds 146, an existing plant, or other target. For example, the offset distance may be measured from group 148 of seeds 146 extending in the direction of travel of row unit 114 and planter 112. An offset distance of 0 results in fluid F being applied substantially at group 148 of seeds 146 with fluid extending a fluid band length in the direction of travel. An offset distance of greater than 0 results in an offset between group 148 and the point at which fluid F is applied, such that a gap exists between group 148 and fluid F, with fluid F extending from the end of the gap and in the direction of travel. An offset distance of less than 0 results in application of the fluid F beginning in front of group 148 and continuing in the direction of travel on or under at least one seed 146 of group 148. The offset distance may be provided to controller 222 and/or the control system from an operator via a user interface (shown in FIGS. 4 and 5). Controller 222 and/or the control system may be configured to control the timing of the valve pulse sent to valve 182 such that valve 182 opens and closes at a time that generates the offset of fluid F described herein.

Controller 222 and/or the control system of planter 112 determines the fluid band length of fluid F and the position of the fluid band relative to group 148 of seeds 146, as described in greater detail with reference to FIGS. 5 and 6. Controller 222 and/or the control system of planter 112 displays this information to the operator of planter 112 using a user interface (shown in FIG. 5). Based on this information, the operator may be able to manually adjust the settings of the fluid dispensing assembly 210 and/or planter 112 to achieve desired application characteristics, such as a desired fluid band length and/or a desired spacing between the fluid band and a seed 146, group 148 of seeds 146, plant, or other target ahead of or behind the fluid band relative to the direction of travel of row unit 114 and planter 112. For example, an operator may adjust, using the control system, the pressure and/or flow rate of the fluid F supplied to the valve 182, the duration of the valve 182 pulse (e.g., the amount of time valve 182 is open for each spray), the volume of fluid F being dispensed and/or any other suitable operating parameter. The operator may further adjust other settings and/or parameters such as the speed of planter 112 to adjust the fluid band length of fluid F and/or the offset of the fluid band from group 148 of seeds 146. In some embodiments, controller 222 and/or the control system of planter 112 displays images, captured by sensors 250 and/or 252, of seeds 146 and the dispensed fluid F to an operator of planter 112 allowing for further adjustment of fluid dispensing assembly 210 and/or other systems.

Moreover, in one embodiment, the controller 222 and/or the control system may also be configured to control a flow rate of the fluid F supplied to valve 182 by controlling the operation of a suitable flow regulating valve. For example, controller 222 and/or the control system may be configured to determine the flow rate of the fluid F supplied through the fluid conduit 228 based on inputs received from one or more suitable meters and/or sensors positioned upstream of valve 182, such as one or more turbine meters associated with a pump supplying manifold 236, one or more tank level meters associated with a fluid source or reservoir supplying manifold 236, one or more flow meters associated with fluid conduit 228, one or more pressure sensors and/or other sensors. In addition, controller 222 and/or the control system may also be configured to receive operator inputs, from a user interface, corresponding to a desired flow rate for fluid dispensing assembly 210. Accordingly, based on such inputs, the controller 222 and/or the control system may be configured to control the operation of the flow regulating valve so as to maintain the fluid F supplied to valve 182 at the desired flow rate. Controller 222 and/or the control system of planter 112 may further use these inputs to determine the fluid band length of fluid F applied by fluid dispensing assembly 210.

Further, in one embodiment, controller 222 and/or the control system may also be configured to control the pressure of the fluid F supplied to valve 182. For example, one or more pressure sensors may be configured to monitor the pressure of the fluid F and transmit pressure measurements to controller 222 and/or the control system. The controller 222 and/or the control system may, in turn, be configured to pulse valve 182 at a suitable frequency and/or duty cycle in order to maintain a specific pressure upstream of valve 182, such as within fluid conduit 228 or manifold 236. Such pressure based control may allow controller 222 and/or the control system to vary the amount of fluid F being applied on and/or adjacent to each group 148 of seeds 146 while operating valve 182 at a constant pulse duration.

Figure 5:
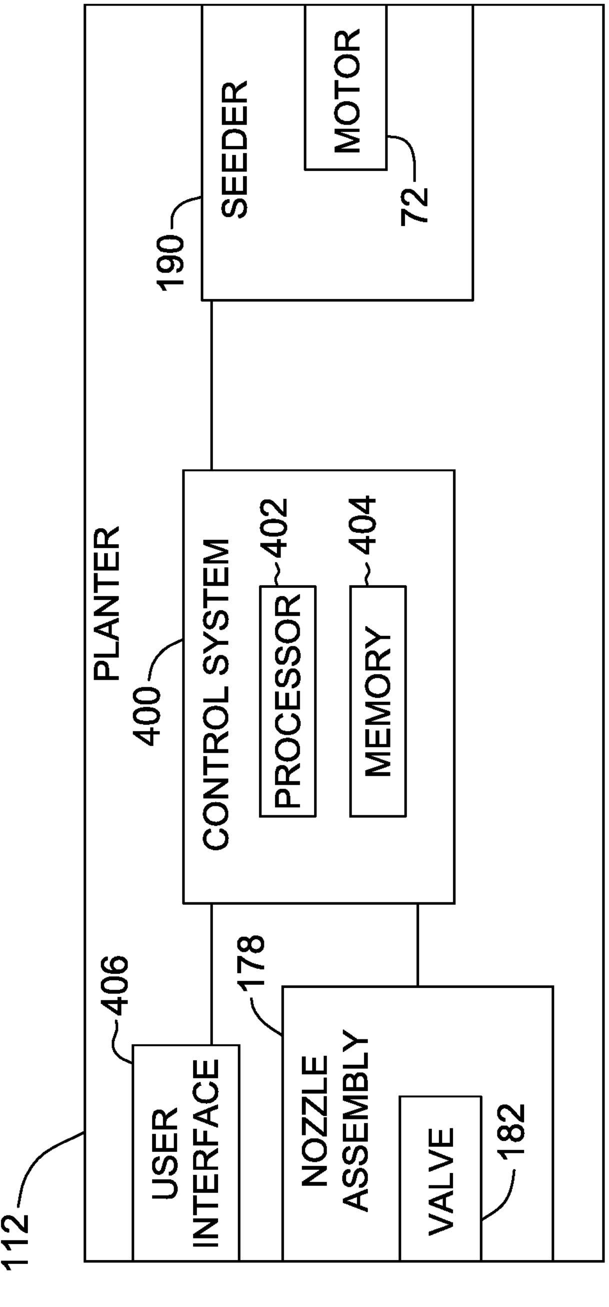
FIG. 5 is a block diagram of the seed planting and agricultural fluid application system shown in FIGS. 1 and 2.

Referring now to FIGS. 3 and 5, in some embodiments, controller 222 is implemented as part of control system 400 of planter 112 and is not a standalone controller. In alternative embodiments, controller 222 is in communication with control system 400 of planter 112 (e.g., via a data bus). Controller 222 and/or control system 400 may generally be or include any suitable computer and/or other processing unit, including any suitable combination of computers, processing units and/or the like that may be operated independently or in connection within one another. Controller 222 and/or control system 400 may include one or more processor(s) 402 and associated memory device(s) 404 configured to perform a variety of computer-implemented functions (e.g., performing the calculations, determinations, and functions disclosed herein). As used herein, the term "processor" refers not only to integrated circuits, but also refers to a controller, a microcontroller, a microcomputer, a programmable logic controller (PLC), an application specific integrated circuit, and other programmable circuits. Additionally, the memory device(s) 404 of the controller 222 and/or control system 400 may generally be or include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 404 may generally be configured to store suitable computer-readable instructions that, when implemented by the processor(s), configure or cause controller 222 and/or control system 400 to perform various functions described herein including, but not limited to, controlling seeder assembly 190 (shown in FIG. 2), controlling the operation of valve 182, calculating time delays for valve 182, controlling a flow rate of the fluid F supplied to valve 182, controlling the pressure of the fluid F supplied to valve 182, determining a fluid band length of fluid F, determining a position of the fluid band (e.g., the coverage of fluid F on the ground) relative to group 148 of seeds 146, receiving inputs from user interface 406, providing output to an operator via user interface 406, receiving data from sensor(s) 250, and/or various other suitable computer-implemented functions.

Figure 4:
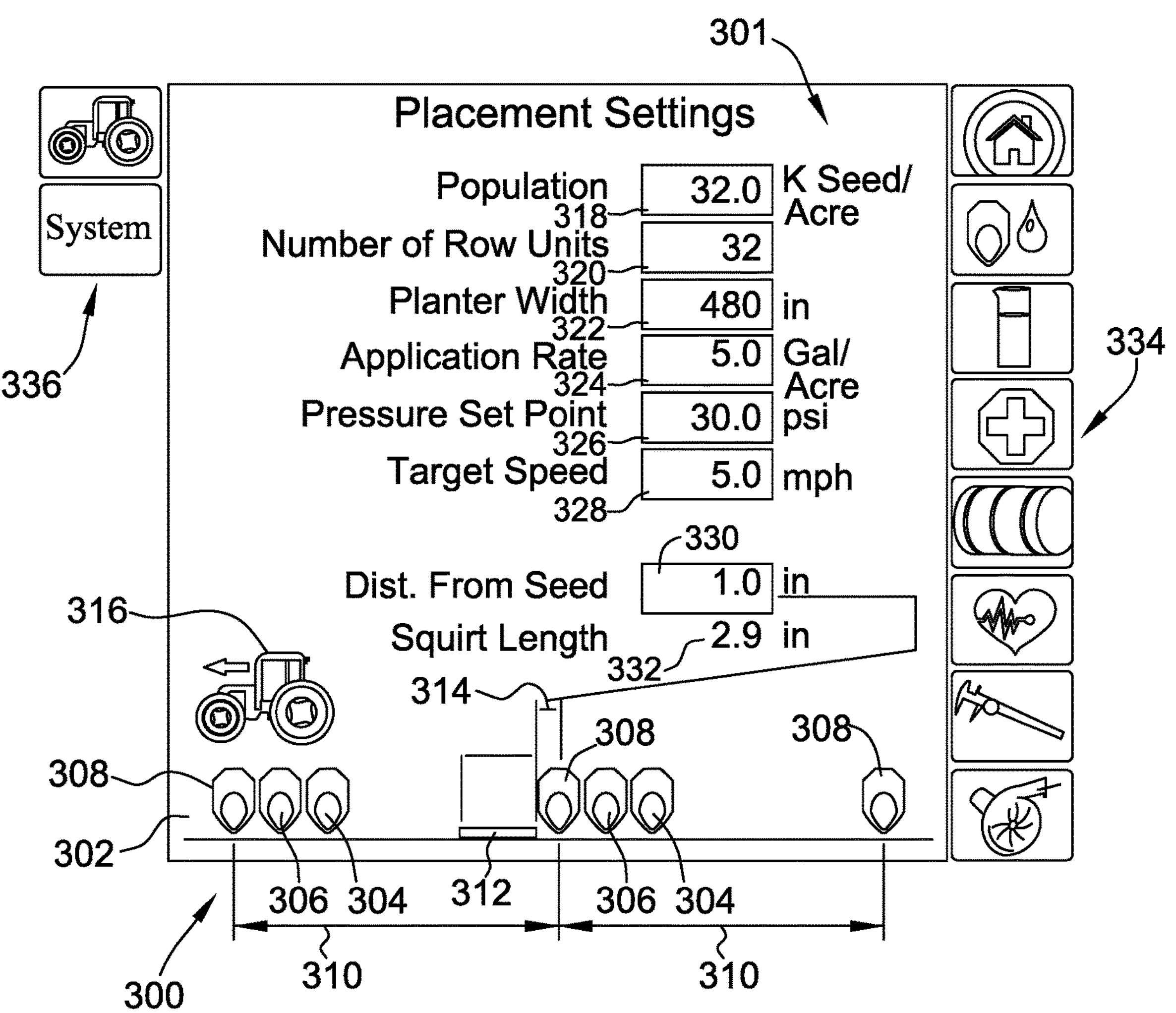
FIG. 4 is a view of a user interface of the seed planting and agricultural fluid application system shown in FIGS. 1 and 2.

Referring now to FIG. 4, a user interface display 300 displayed by user interface 406 (shown in FIG. 5) is shown according to one embodiment. User interface display 300 includes a page 301 configured to display and receive information, a navigation toolbar 334 configured to switch between display of different pages 301, and a system toolbar 336 for navigating between different systems of planter 112 and/or row unit 114.

Pages 301 include placement settings page 301. Placement settings page 301 includes a plurality of fields 318, 320, 322, 324, 326, 328, 330, and 332. Placement settings page 301 further includes a graphical representation 302 corresponding to the information in the plurality of fields 318, 320, 322, 324, 326, 328, 330, 332 and a fluid or spray band length (e.g., squirt length) determined by controller 222 and/or the control system of planter 112 (shown in FIG. 5), as described herein with reference to FIGS. 5 and 6.

Fields 318, 320, 322, 324, 326, 328, 330, and 332 are configured to allow for the display and/or entering of information. For example, fields 318, 320, 322, 324, 326, 328, 330, and 332 are selectable by a press on a touchscreen of user interface 406 (shown in FIG. 5) or a click with a cursor controlled by a mouse of user interface 406. Once selected, fields 318, 320, 322, 324, 326, 328, 330, and 332 receive information from a touchscreen keyboard, keyboard, or other device of user interface 406. In alternative embodiments, one or more fields 318, 320, 322, 324, 326, 328, 330, and 332 are replaced by other graphical user interface elements such as drop down menus, a series of radio buttons and corresponding values, sliders, and/or other graphical user interface elements. In some embodiments, squirt length field 332 is not editable and does not receive information, and instead only displays information related to the fluid band length (e.g., squirt length) as determined by controller 222 and/or the control system of row unit 114 or planter 112. In other embodiments, squirt length field 332 is editable, and can receive information regarding a length of fluid (e.g., in inches or centimeters) to be applied to each group of seeds.

Population field 318 is configured to allow an operator to enter information regarding the number of seeds 146 (shown in FIG. 2) to be planted. For example, population field 318 allows an operator to enter, using user interface 406, a number of seeds 146 to be planted per acre (or other unit area, such as square meters). Number of row units field 320 is configured to allow an operator to enter information regarding the number of rows of seeds 146 to be planted. For example, number of row units field 320 allows an operator to enter, using user interface 406, a number of row units 114 included in system 100. In other embodiments, number of row units field 320 may be a number of rows field that allows an operator to enter, using user interface 406, a number of rows as a dimensionless value. In yet other embodiments, number of row units field 320 is not editable. Rather, controller 222 and/or the control system of row unit 114 or planter 112 determines the number of rows based on other information using techniques described herein and number of row units field 320 displays this information. Planter width field 322 is configured to allow an operator to enter information regarding the planter width. For example, planter width field 322 allows an operator to enter, using user interface 406, a planter width in inches (or other unit length, such as centimeters or meters). Application rate field 324 is configured to allow an operator to enter information regarding the application rate of fluid F (shown in FIG. 2). For example, application rate field 324 allows an operator to enter, using user interface 406, an application rate of fluid F in gallons per acre (or any other suitable unit volume per unit area). In other embodiments, application rate field 324 allows an operator to enter, using user interface 406, an application rate of fluid F in units of volume per seed or group of seeds, such as milliliters or ounces per seed or group of seeds. Pressure set point field 326 is configured to allow an operator to enter information regarding a desired or target operating pressure of fluid F. For example, pressure set point field 326 allows an operator to enter, using user interface 406, a desired pressure set point of fluid F within manifold 236 (shown in FIG. 3) in pounds per square inch (or other suitable units of pressure). Target speed field 328 is configured to allow an operator to enter information regarding the speed of planter 112 and/or row unit 114. For example, target speed field 328 allows an operator to enter, using user interface 406, a speed in miles per hour or kilometers per hour. Distance from seed field 330 is configured to allow an operator to enter information regarding the distance from a group of seeds 146 at which a band of applied fluid F begins (e.g., the distance fluid F, as applied, is offset from group 148 of seeds 146). For example, distance from seed field 330 allows an operator to enter, using user interface 406, a desired offset distance in inches (or other suitable unit length, such as centimeters or meters). In some embodiments, an operator may enter, using user interface 406, a number of seeds per group.

Graphical representation 302 corresponds to the information in the plurality of fields 318, 320, 322, 324, 326, 328, 330, 332 and a fluid band length (e.g., squirt length) determined by controller 222 and/or the control system of planter 112 (shown in FIG. 5), and depicts the fluid band length and offset distance graphically (i.e., with a visual graphic). Graphical representation 302 includes first seed graphics 304, middle seed graphics 306, last seed graphics 308, a distance 310 between seeds 146 or seed groups 148, a fluid band length graphic 312, an offset distance graphic 314, and a direction of travel graphic 316. In some embodiments, elements of graphical representation 302 are static, while others are dynamically updated to reflect changes in operating conditions of planter 112, such as the fluid band length and the offset distance between fluid band and seeds 146. In one embodiment, for example, the location and spacing of seed graphics 304, 306, 308 are static, and the fluid band length graphic 312 and offset distance graphic 314 are updated to reflect changes in fluid band length and offset distance. In another embodiment, the distance 310 between seed graphics 304, 306, 308 is updated to reflect changes in the spacing between seeds 146 or groups of seeds 146 dispensed by planter 112. In alternative embodiments, graphical representation 302 scrolls or otherwise is active as row unit 114 and/or planter 112 travels.

First seed graphics 304 represent first seeds 150 in each group 148. In each group 148, first seed 150 is dispensed from seed meter 156 and passes through seed tube 158 first, i.e., before any other seeds 146 in group 148. Last seed graphics 308 represent last seeds 152 in each group 148. In each group 148, last seed 152 is dispensed from seed meter 156 and passes through seed tube 158 last, i.e., after all other seeds 146 in group 148. Middle seed graphics 306 represent middle seeds 151 in each group 148. In each group 148, middle seeds 151 are dispensed from seed meter 156 and pass through seed tube 158 after first seed 150 and before last seed 152. Group 148 may include one or more middle seeds 151. In alternative embodiments, graphical representation 302 may include any seed graphics 304, 306, 308 that enable system 112 to operate as described herein. For example, in some embodiments, middle seed graphics 306 are omitted. In further embodiments, graphical representation 302 includes seed graphics 304, 306, 308 that represent all seeds in each group with a single graphic.

The first group of seed graphics 304, 306, 308 corresponds to a group 148 of seeds 146 which has not been dispensed and indicates the location where the group will be dispensed. Alternatively, the first group of seed graphics 304, 306, 308 represents the most recently dispensed group 148 of seeds 146 closest to row unit 114 and/or planter 112 travelling in the direction indicated by travel direction graphic 316. In some embodiments, the first group of seed graphics 304, 306, 308 corresponds to a group 148 of seeds 146 for which a corresponding amount of fluid F has not yet been applied. The first group of seed graphics 304, 306, 308 is separated from the second group of seed graphics 304, 306, 308 by distance 310. The second group of seed graphics 304, 306, 308 corresponds to a group 148 of seeds 146 which has already been dispensed and for which a corresponding amount of fluid F has already been applied or a corresponding amount of fluid F is being applied. Distance 310 reflects the distance between the two groups 148 of seeds 146. The third group of seed graphics 304, 306, 308 (only graphic 308 shown in FIG. 4) represents a third group of seeds 146 for which a corresponding amount of fluid F has already been applied. The third group of seed graphics 304, 306, 308 is separated from the second group of seed graphics 304, 306, 308 also by distance 310. In some embodiments, distance 310 is to scale and corresponds to the distance between groups 148 of seeds 146 which have been dispensed. In alternative embodiments, distance 310 is not to scale.

Fluid band length graphic 312 corresponds to the value displayed in squirt length field 332. Offset distance graphic 314 corresponds to the value displayed in distance from seed field 330. As the values in their corresponding fields change, fluid band length graphic 312 and offset distance graphic 314 change in length and/or position, relative to the second group of seed graphics 304, 306, 308, within graphical representation 302. Offset distance graphic 314 and fluid band length graphic 312 are shown at scale (e.g., the same scale at which distance 310 is shown). Advantageously, this allows an operator to determine if fluid F is being applied as desired; to change parameters entered in one or more of fields 318, 320, 322, 324, 326, 328, 330, and 332; and to view the effect of the changed parameters on both the fluid band length (e.g., both in length and position relative to seeds 146) and the offset distance. In alternative embodiments, fluid band length graphic 312 and/or offset distance graphic 314 are not shown to scale or are shown at a different scale than that with which distance 310 is shown.

Should the calculated fluid band length graphic 312 become large enough to violate the offset distance graphic 314 of the former or later group 148 of seeds 146 dropping or to be dropped, associated with seed graphics 308 and 304 respectively, a positive warning graphic is displayed on the user interface graphic 302 giving indication of a possible unintended error condition. This warning allows an operator to change one or more parameters, if desired, to prevent fluid F from being dispensed within an offset distance associated with an adjacent group 148 of seeds 146. For example, controller 222 or the control system of planter 112 (shown in FIG. 5) determines the fluid band length, offset distance, and distance between groups 148 of seeds 146 as described herein. Controller 222 or the control system further determines if the sum of the fluid band length and the offset distance is greater than the distance between groups 148 of seeds 146 such that applying fluid to a first group 148 of seeds 146 would result in fluid F contacting at least one seed 146 of an adjacent group 148. In response to determining that fluid F will come in contact with a seed 146 of an adjacent group 148, controller 222 or the control system causes the user interface to convey a warning. In some embodiments, controller 222 or the control system further determines if the sum of the fluid band length and the offset distance is greater than a threshold value such that applying fluid to a first seed would result in fluid F falling within an offset distance associated with an adjacent group 148 of seeds 146. In response to determining that fluid F will fall within the offset distance of an adjacent group 148 of seeds 146, controller 222 or the control system causes the user interface to convey a warning. In some embodiments, the user interface conveys the warning graphically (e.g., displaying a warning graphic and/or text), through an audible sound (e.g., playing a tone, sound, voice recording, etc.), providing haptic feedback (e.g., a vibration provided via a vibration motor included in the user interface) and/or through other visual, aural, or tactile outputs.

In some embodiments, user interface 406 is configured to identify one or more seeds 146 of each group 148 as a trigger seed based on input from an operator. For example, an operator may select one or more of seed graphics 304, 306, 308 using user interface 406 and user interface 406 may identify the selected graphics 304, 306, 308 as the trigger seed. In addition or alternatively, the operator may input a value such as a numerical value in a field of user interface 406 to identify the trigger seed. For example, where a group of N seeds is dispensed through seed tube 158, the operator may input a numerical value between 1 and N to identify the trigger seed (e.g., the number one to indicate that the first seed is the trigger seed, the number two to indicate that the second seed is the trigger seed, and so on). In some embodiments, the operator may input a text value such as "first", "middle", or "last" to indicate which seed is the trigger seed. Control system 400 determines the trigger time for nozzle assembly 178 based on the detection time of the user-selected trigger seed. If an operator identifies two or more seeds as trigger seeds, control system 400 may determine the trigger time based on the detections signals for both trigger seeds using an algorithm such as the algorithms described herein for identifying a middle seed.

FIG. 5 shows a block diagram of planter 112 according to one embodiment. Control system 400 of planter 112 is coupled to seeder assembly 190, user interface 406, and nozzle assembly 178. Control system 400 is configured to control these and/or other components to perform the functions described herein. Seeder assembly 190 includes motor 72 as described with reference to FIG. 2. Control system 400 controls motor 72 to control the rate at which seeds 146 (shown in FIG. 2) are dispensed and/or otherwise controls seeder assembly 190 to perform the functions described herein. Control system 400 further controls nozzle assembly 178 to perform the functions described herein such as controlling when fluid F (shown in FIG. 2) is applied, controlling for what length of time fluid F is applied, and/or other functions of nozzle assembly 178 described herein. For example, control system 400 controls valve 182 using pulse width modulation as described herein.

Control system 400 includes processor 402 and memory 404. As described above, processor 402 and memory 404 are configured to cause control system 400 to perform the functions described herein. For example, memory 404 may include programs, instructions, formulas, look up tables, databases, and/or other information which, when executed or otherwise utilized by processor 402, cause performance of the functions of planter 112 and/or row unit 114 described herein.

User interface 406 is configured to receive information from an operator and to provide information to the operator. For example, and without limitation, user interface 406 includes input devices including a keyboard, mouse, touchscreen, joystick(s), throttle(s), buttons, switches, and/or other input devices. For example, and without limitation, user interface includes output devices including a display (e.g., a liquid crystal display (LCD), or an organic light emitting diode (OLED) display), speakers, indicator lights, instruments, and/or other output devices. Control system 400 uses information stored in memory 404 to generate user interface display 300 (shown in FIG. 4) and to receive information from the operator and display information to the operator.

Control system 400 is configured to receive information from user interface 406 including fluid volume information, seed volume information, main pressure information, speed information, and distance from seed information. Fluid volume information is information that control system 400 uses to determine the volume of fluid F to be applied on or adjacent to each seed, group of seeds, plant, or other target (e.g., using one or more of the techniques described herein). For example, fluid volume information includes a seed population in thousands of seeds per acre, a number of rows to which fluid is applied, planter width in inches, an application rate in gallons per acre, and/or other information. Seed volume information is information that control system 400 uses to determine the distance between groups 148 of seeds 146 (e.g., using one or more of the techniques described herein). For example, seed volume information includes a seed population in thousands of seeds per acre, a number of seeds in each group, a number of rows to be sprayed, planter width in inches, and/or other information. Main pressure information is information that describes, or is used by control system 400 to determine, a pressure at which fluid F is supplied to nozzle assembly 178 (shown in FIG. 2). For example, main pressure information includes a pressure in pounds per square inch of fluid F in manifold 236 (shown in FIG. 3) that supplies nozzle assembly 178. Speed information is information that describes the speed of row unit 114 and/or planter 112. For example, speed information is a speed in miles per hour. Distance from seed (e.g., offset) information is information that specifies a distance between fluid F as applied and seed 146. For example, distance from seed information is in inches. Distance from seed or offset distance information is used by control system 400 to determine the distance between fluid F, as applied, and seed 146. Control system 400 may also use this information to control nozzle assembly 178 to dispense fluid F such that fluid F, as applied, is offset from seed 146 by the specified distance (e.g., using one or more of the techniques described herein).

Control system 400 is configured to display information to an operator using user interface 406. The information displayed includes fluid squirt length and fluid position relative to at least one seed 146, group 148 of seeds 146, plant or other target. The information displayed may also include volume information, main pressure information, speed information, and distance from seed information. Control system 400 displays fluid squirt length (e.g., fluid band length) and fluid offset distance graphically (e.g., as depicted in user interface display 300 shown in FIG. 4). Control system 400 calculates a scale at which at least two groups 148 of seeds 146, the fluid band length, and the offset distance may be displayed on a display of user interface 406. Using this scale, control system 400 scales graphics which represent the fluid band length and the offset length such that the graphics displayed by user interface 406 depicting this information are to scale. In alternative embodiments, the scale is determined to allow for the display of three groups of seeds 146. The resulting display shows the distance between groups 148 of seeds 146, the fluid band length, and the offset distance at scale. This allows an operator to quickly and easily determine the relationship between groups 148 of seeds 146 and fluid F as will be applied given the current parameters of row unit 114 and/or planter 112. The operator may then alter one or more parameters to achieve a desired application of fluid F relative to groups 148 of seeds 146. For example, the operator may adjust a speed of planter 112, a pressure of fluid F delivered to nozzle assembly 178, operation of valve 182 (e.g., timing, opening percentage, and/or other parameters), change a tip 234, and/or otherwise adjust other parameters of row unit 114 and/or planter 112.

In one embodiment, control system 400 determines the fluid band length of fluid F, e.g., squirt length, using the information received from user interface 406. Control system 400 determines a volume of fluid F to be applied per group 148 of seeds 146 by calculating the quotient of the volume of fluid F per acre and the number of seeds (e.g., population) per acre and multiplying the quotient by the number of seeds 146 in each group 148. Alternatively, control system 400 may determine the number of groups per acre by calculating the quotient of the number of seeds (e.g., population) per acre and the number of seeds 146 in each group 148. Control system 400 may then determine the volume of fluid F to be applied per group 148 of seeds 146 by calculating the quotient of the volume of fluid F per acre and the number of groups 148 per acre. Control system 400 calculates the time valve 182 (shown in FIG. 2) remains open to dispense the volume of fluid F per group 148 of seeds 146 based on the main pressure and the known geometry and/or other characteristics of tip 234 of nozzle 180 (e.g., the area of the opening of tip 234, length and friction loss of tip 234, and/or other information). Control system 400 calculates the flow rate of fluid through nozzle 180 using known relationships between pressure and fluid flow rate, such as Bernoulli's equation, and calculates the time that valve 182 remains open by dividing the volume of fluid F per group 148 of seeds 146 by the flow rate. For example, control system 400 calculates the velocity of fluid F through nozzle 180 by taking the square root of the product of 2 and the quotient of main pressure and the density of fluid F. Control system 400 determines the flow rate of nozzle 180 by taking the product of the velocity of fluid F through nozzle 180 and the area of tip 234. Control system 400 determines the duration of time during which fluid F is dispensed by calculating the quotient of the volume of fluid F per group 148 of seeds 146 and the flow rate of fluid F through nozzle 180. Control system 400 determines the fluid band length of fluid F by taking the product of the duration of time during which fluid F is dispensed and the velocity, e.g., speed, of row unit 114 and/or planter 112. In alternative embodiments, control system 400 calculates the fluid band length using the area of nozzle 180 rather than the area of tip 234.

In some embodiments, control system 400 further applies a scaling factor to determine the fluid band length. For example, control system 400 determines an initial fluid band length using the technique described above. Control system 400 determines the fluid band length of fluid F by taking the product of the initial fluid band length and the scaling factor. The scaling factor modifies the initial fluid band length to account for factors such as a check valve included in nozzle assembly 178 and/or fluid dispensing assembly 210, tip 234 included in nozzle assembly 178, and/or other factors. The scaling factor may be selected based on specific equipment parameters (e.g., identification by the operator of the type of tip 234 using user interface 406). For example, and without limitation, the scaling factor may be less than 1, greater than 1, within a range from 0.5 to 2, or any other suitable value. In some embodiments, the scaling factor is 1.3, 1.5, 1.7, or In some embodiments, control system 400 accounts for a type of tip 234 and/or parameters describing the spray pattern produced by tip 234 in determining the velocity of fluid F, the fluid band length, and/or the scaling factor. For example, control system 400 uses information about tip 234 received from user interface 406 and entered by an operator (e.g., using page 601 shown in FIG. 7).

In alternative embodiments, other suitable techniques are used to calculate or otherwise determine the squirt length of fluid F. For example, control system 400 may use a look up table and the received information to determine the squirt length of fluid F.

Control system 400 also determines a distance between groups 148 of seeds 146 in a single furrow 138 (shown in FIG. 2). Control system 400 determines the distance between groups 148 based on the population of seeds, number of rows, the number of seeds in each group, and the planter width. For example, control system 400 determines the quotient of the number of groups of seeds and the number of rows (e.g., determined based on the planter width). The distance between seeds 146, e.g., the seed spacing, is a function of seed population and row spacing.

Figure 6:
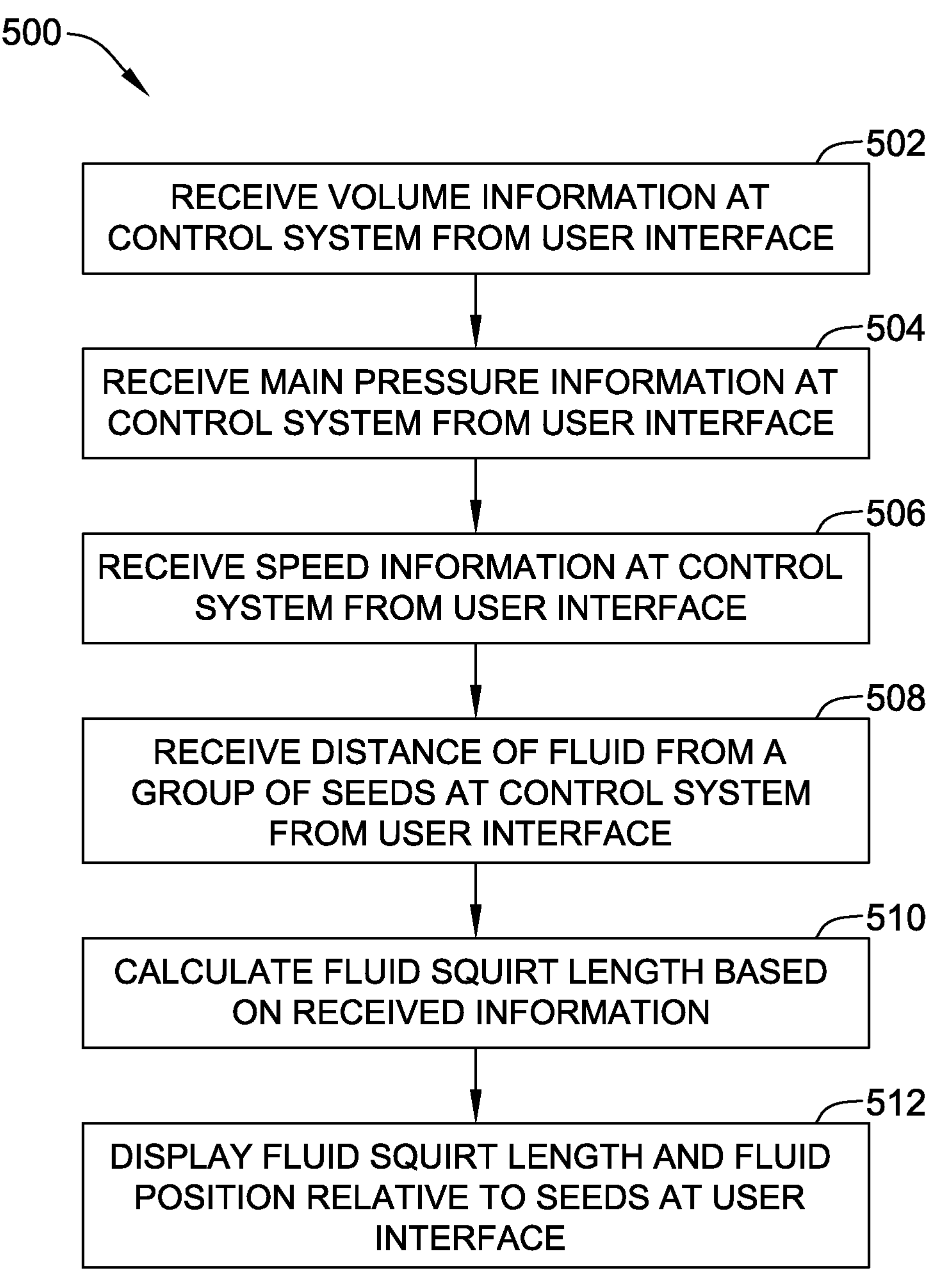
FIG. 6 is a flow chart of a method of determining and visually depicting fluid band length of the seed planting and agricultural fluid application system shown in FIGS. 1 and 2.

FIG. 6 shows an exemplary process 500 for determining a fluid band length of fluid F and determining a position of fluid F relative to group 148 of seeds 146 (shown in FIG. 2), e.g., the offset distance between group 148 and the coverage of fluid F on the ground. Control system 400 (shown in FIG. 5) receives 502 volume information (e.g., fluid volume information and/or seed volume information) from user interface 406 (shown in FIG. 5). Volume information is information that control system 400 uses to determine the volume of fluid F to be applied on or adjacent to each seed, group of seeds, plant, or other target (e.g., using one or more of the techniques described herein). Volume information is also information that control system 400 uses to determine the distance between groups 148 of seeds 146 (e.g., using one or more of the techniques described herein). For example, volume information includes a seed population in thousands of seeds per acre, a number of seeds per group, a number of rows to which fluid is applied, planter width in inches, an application rate in gallons per acre, and/or other information. Control system 400 receives 504 main pressure information from user interface 406. Main pressure information is information that describes, or is used by control system 400 to determine, a pressure at which fluid F is supplied to nozzle assembly 178 (shown in FIG. 2). For example, main pressure information includes a pressure in pounds per square inch of fluid F in manifold 236 (shown in FIG. 3) that supplies nozzle assembly 178. Control system 400 receives 506 speed information from user interface 406. Speed information is information that describes the speed of row unit 114 and/or planter 112. For example, speed information is a speed in miles per hour. Control system 400 receives 508 a distance of fluid F from group 148 of seeds 146 (e.g., an offset distance). This offset distance is used by control system 400 to determine the distance between fluid F, as applied, and group 148. Control system 400 may also use this information to control nozzle assembly 178 to dispense fluid F such that fluid F, as applied, is offset from seed 146 by the specified distance (e.g., using one or more of the techniques described herein).

Based on at least the volume information, main pressure information, and speed information, control system 400 calculates 510, or otherwise determines, a fluid squirt length of fluid F (e.g., the length of fluid F as applied to the ground). Control system 400 uses one or more of the techniques described herein to determine the squirt length. For example, control system 400 determines a volume of fluid F to be applied per group 148 of seeds 146 by calculating the quotient of the volume of fluid F per acre and the number of groups 148 of seeds 146 per acre. Control system 400 calculates the time valve 182 (shown in FIG. 2) remains open to dispense the volume of fluid F per seed 146 based on the volume of fluid F per seed, the main pressure, and the known geometry and/or other characteristics of tip 234 or nozzle 180 (e.g., the area of the opening of tip 234, length and friction loss of tip 234, and/or other information). Control system 400 then calculates the fluid band length (e.g., squirt length) based on the time valve 182 remains open and the speed information (e.g., velocity of row unit 114 and/or planter 112).

Control system 400 displays 512 the fluid squirt length and fluid position relative to at least one seed 146, group 148 of seeds, plant or other target using user interface 406. The fluid position relative to group 148 (e.g., offset distance) is determined by control system 400 using the input of distance of fluid F from group 148 and the fluid squirt length. The distance between groups 148 of seeds 146 is determined, as described herein, based on the volume information received from user interface 406. In some embodiments, control system 400 displays the fluid squirt length and offset distance at scale. This allows an operator to visually determine the relationship between multiple seeds 146 and fluid F as applied to groups 148 of seeds 146.

Figure 7:
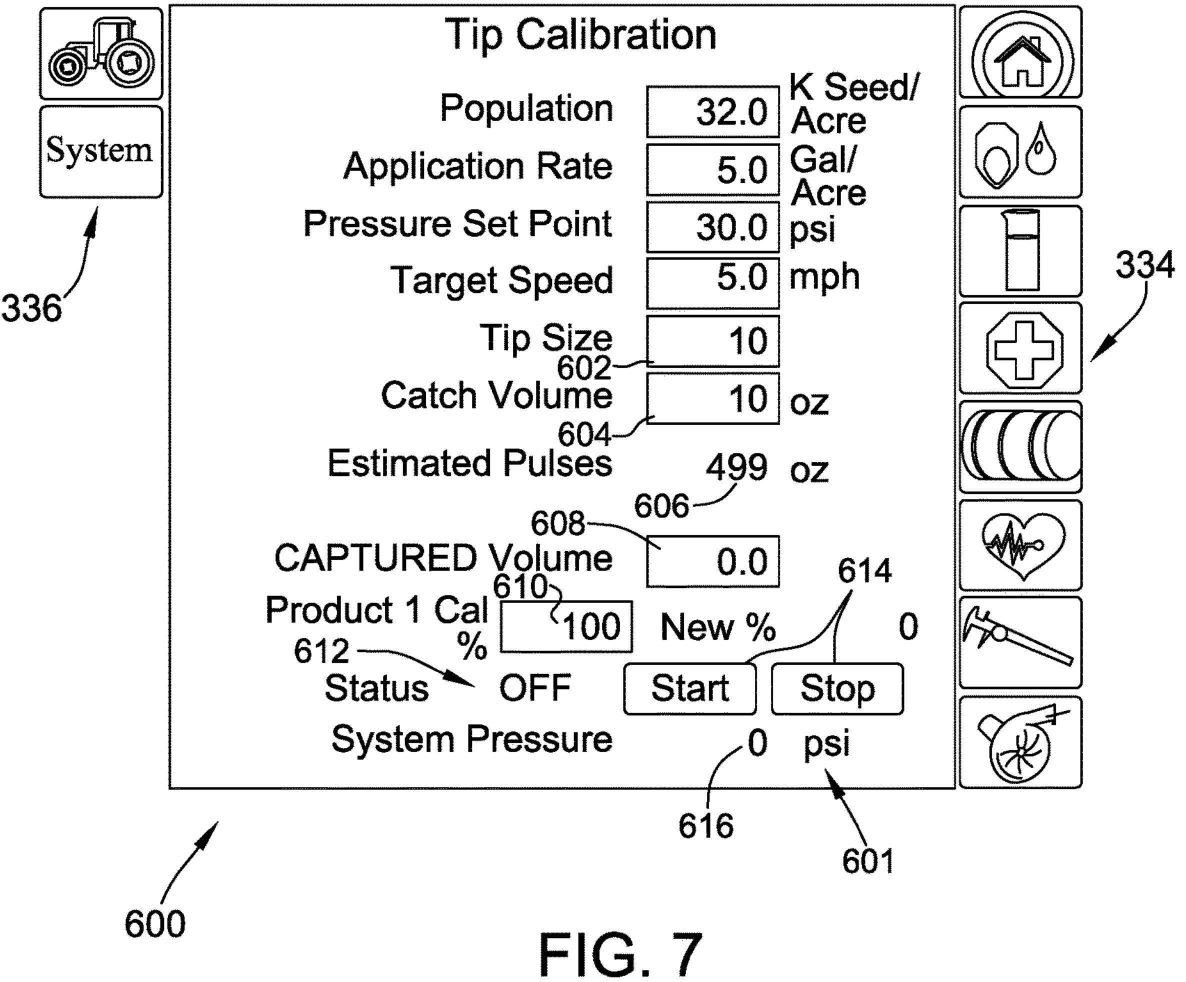
FIG. 7 is a view of a tip calibration page of the user interface of the seed planting and agricultural fluid application system shown in FIGS. 1 and 2.

Referring now to FIG. 7, user interface display 300 (shown in FIG. 4) includes page 601 for receiving tip calibration information and/or performing a tip calibration of tip 234 (shown in FIG. 3). An operator may navigate to page 601 using system toolbar 336 and/or navigation toolbar 334.

Page 601 includes a plurality of fields 602, 604, 606, 608, and 610. Page 601 further includes status graphic 612 and start/stop buttons 614. Fields 602, 604, 606, 608, and 610 are configured to allow for the display and/or entering of information. For example, fields 602, 604, 606, 608, and 610 are selectable by a press on a touchscreen of user interface 406 (shown in FIG. 5) or a click with a cursor controlled by a mouse of user interface 406. Once selected, fields 602, 604, 606, 608, and 610 receive information from a touchscreen keyboard, keyboard, or other device of user interface 406. In alternative embodiments, one or more fields 602, 604, 606, 608, and 610 are replaced by other graphical user interface elements such as drop down menus, a series of radio buttons and corresponding values, sliders, and/or other graphical user interface elements. In some embodiments, any of fields 602, 604, 606, 608, and 610 are not editable and instead only display information determined or received by controller 222 and/or the control system of row unit 114 or planter 112.

Tip size field 602 receives information from an operator which identifies the size of tip 234. For example, tip size field 602 receives a tip size in dimensionless units. The tip size may be an industry standard describing tip 234 and/or otherwise describes the tip size of tip 234. Catch volume field 604 receives information from an operator which identifies a catch volume associated with tip 234. For example, the catch volume may correspond to a single spray from tip 234 in ounces. Estimated pulses field 606 is not editable. Estimated pulses field 606 displays estimated pulses which are a catch volume and/or volume per seed

146. For example, 0 to 1 ounces, 0.01 to 0.1 ounces, greater than one ounce, 0.01 ounces, 0.02 ounces, 0.03 ounces, 0.04 ounces, 0.1 ounces, or any other amount of fluid F may be applied per seed 146 or group 148 of seeds 146. The estimated pulses field 606 value is determined, by control system 400 (shown in FIG. 5), based at least on the tip size and catch volume (e.g., known catch volume or a catch volume determined by calibration as described below). It may also be determined using population, application rate, pressure set point, and/or target speed information (e.g., entered in and carried over from page 301 shown in FIG. 4).

Captured volume field 608 allows an operator to calibrate a specific tip 234 and/or flow through application system 112. For example, captured volume field allows an operator to enter a captured volume amount in ounces corresponding to a spray from tip 234. The spray is initiated using start/stop buttons 614 which cause nozzle assembly 178 (shown in FIG. 2) to apply one spray of fluid F from tip 234. Status field 612 displays whether or not nozzle assembly 178 is emitting fluid F. System pressure field 616 shows the pressure of nozzle assembly 178 in pounds per square inch. This is the pressure for which tip 234 is calibrated. Based on the captured volume, system pressure, and/or other information, control system 400 determines a new calibration percentage shown in product calibration field 610. Product calibration field 610 may also allow an operator to manually enter a calibration percentage. Control system 400 uses the calibration percentage in determining other parameters related to nozzle assembly 178, row unit 114, and/or planter 112 (e.g., as discussed with reference to FIG. 5). In alternative embodiments, tip calibration as described herein uses more than one spray or pulse of fluid F from tip 234. For example, start/stop buttons 614 initiate a predetermined number of a plurality of sprays/pulses from tip 234. Using the number of sprays/pulses and the total captured volume, tip 234 is calibrated using a plurality of sprays/pulses.

In alternative embodiments, some information is measured, received from other systems, or determined. For example, main pressure information may be measured using one or more pressure sensors. Speed information may be measured, received from another control system or a subsystem of control system 400 of planter 112, or determined from other information. In some embodiments, control system 400 at least partly determines calibration information for tips 234 based on information from sensors such as a flow meter. In further embodiments, control system 400 may be configured to automatically calibrate flow of fluid F through application system 112 as application system 112 travels along the ground and applies fluid F.

Figure 8:
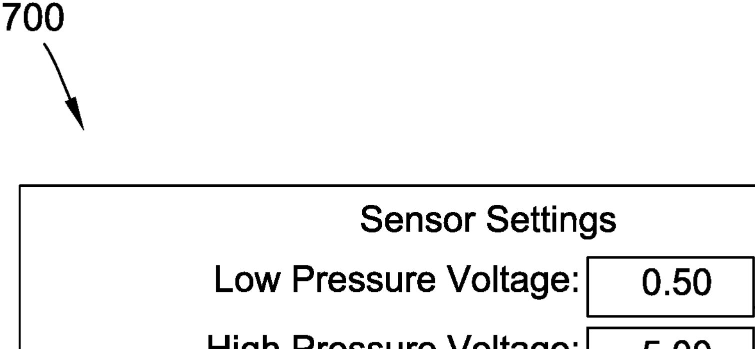
FIG. 8 is a view of a sensor and control setting calibration page of the user interface of the seed planting and agricultural fluid application system shown in FIGS. 1 and 2.

Referring now to FIG. 8, user interface display 300 (shown in FIG. 4) may include page 700 for receiving control system and sensor calibration information. An operator may navigate to page 700 using system toolbar 336 (shown in FIG. 4) and/or navigation toolbar 334 (shown in FIG. 4).

Page 700 includes a plurality of fields 702, 704, 706, 708, 710, 712, 714, and 716. Fields 702, 704, 706, 708, 710, 712, 714, and 716 are configured to allow for the display and/or entering of information. For example, fields 702, 704, 706, 708, 710, 712, 714, and 716 are selectable by a press on a touchscreen of user interface 406 (shown in FIG. 5) or a click with a cursor controlled by a mouse of user interface 406. Once selected, fields 702, 704, 706, 708, 710, 712, 714, and 716 receive information from a touchscreen keyboard, keyboard, or other device of user interface 406. In alternative embodiments, one or more fields 702, 704, 706, 708, 710, 712, 714, and 716 are replaced by other graphical user interface elements such as drop down menus, a series of radio buttons and corresponding values, sliders, and/or other graphical user interface elements. In some embodiments, any of fields 702, 704, 706, 708, 710, 712, 714, and 716 are not editable and instead only display information determined or received by controller 222 and/or the control system of row unit 114 or planter 112.

Low pressure voltage field 702 receives information from an operator which identifies calibration information for a sensor when the system is operating in a low pressure mode. For example, low pressure voltage field 702 receives a power measurement in Volts. High pressure voltage field 704 receives information from an operator which identifies calibration information for a sensor when the system is operating in a high pressure mode. For example, high pressure voltage field 704 receives a power measurement in Volts. Low pressure value field 706 receives information from an operator identifying a low pressure setting of the system. For example, low pressure value field 706 receives a low pressure threshold in pounds per square inch (psi). High pressure value field 708 receives information from an operator identifying a high pressure setting of the system. For example, high pressure value field 708 receives a high pressure threshold in psi. Minimum speed override field 710 receives information from an operator which identifies a minimum speed value. For example, minimum speed override field 710 receives a speed in miles per hour (mph). For example, control system 400 is configured to compare a determined speed of the system, i.e., a speed provided by a global positioning system (GPS) or other sensor, to the value in minimum speed override field 710. If the determined speed is greater than or equal to the minimum speed override field 710, control system 400 will use the determined speed. If the speed of the system is determined to be below the value in the minimum speed override field 710, control system 400 (shown in FIG. 5) and/or the control system of row unit 114 or planter 112 will use the value from field 710 for the calculations described herein and to control planter 112. Row location of GPS field 712 receives information from an operator which identifies the location of the GPS sensor on the system. For example, row location of GPS field 712 receives a location of the GPS relative to row units of the system in dimensionless units. Hilldrop field 712 receives information from an operator relating to a hilldrop setting of row unit 114 or planter 112. For example, hilldrop field 712 receives a value representing the number of seeds per drop, i.e., the number of seeds in each group 148. Flowmeter cal. field 716 receives information from an operator which identifies a calibration setting of a flowmeter. For example, flowmeter calibration field 716 receives a calibration setting in pulses per gallon. In alternative embodiments, some information is measured, received from other systems, or determined by control system 400 and/or the control system of row unit 114 or planter 112.

Figure 9:
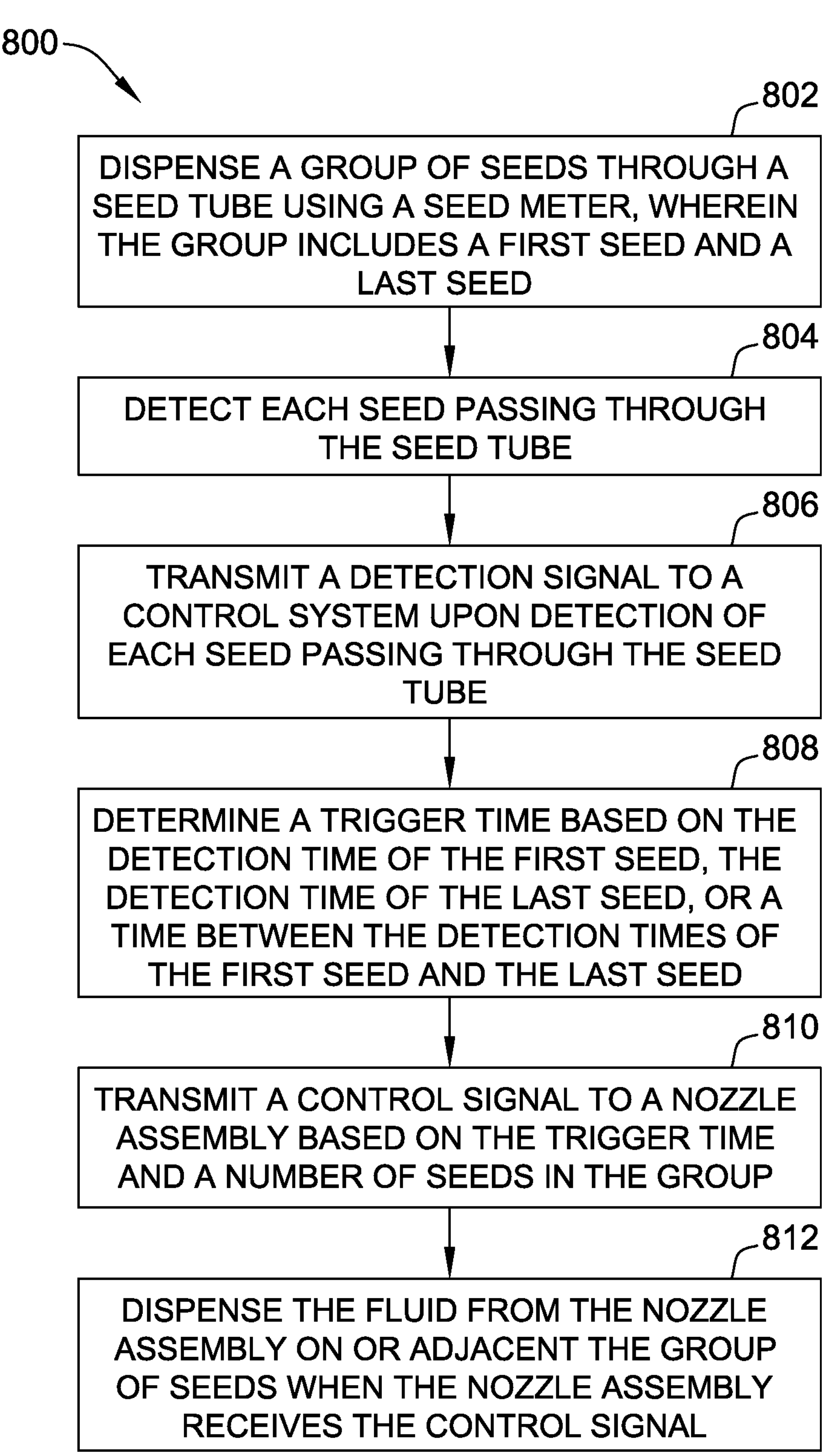
FIG. 9 is a flow chart of a method of planting seeds in groups and dispensing fluid relative to the groups of seeds.

FIG. 9 shows an exemplary process 800 for applying fluid on or adjacent to a group 148 of seeds 146 (shown in FIG. 2). Referring to FIGS. 2, 3, 5, and 9, row unit 114 dispenses 802 a group 148 of seeds 146 through seed tube 158 of seed meter 156. Group 148 of seeds 146 may have two or more seeds 146. Accordingly, group 148 includes a first seed 150 and a last seed 152. In the illustrated embodiment, the group 148 also includes a middle seed 151. In alternative embodiments, group 148 may include four or more seeds 146.

The first seed 150 is dispensed by seed meter 156 before other seeds 146 in group 148. Accordingly, first seed 150 passes through seed tube 158 before other seeds 146 in group 148 and is dispensed to furrow 138 before other seeds 146 in group 148. Last seed 152 is dispensed by seed meter 156 after other seeds 146 of group 148. Accordingly, last seed 152 passes through seed tube 158 after other seeds 146 in group 148 and is dispensed to furrow 138 after the other seeds 146 in group 148. Middle seed 151 is dispensed by the seed meter 156 between first seed 150 and last seed 152. Accordingly, middle seed 151 passes through seed tube 158 after first seed 150 and before last seed 152 and is dispensed to furrow 138 after first seed 150 and before last seed 152. Each group 148 may have more than one middle seed 151.

Seed sensor 250 detects 804 each seed 146 passing through seed tube 158 and transmits 806 a detection signal to control system 400 upon detection of each seed 146 passing through seed tube 158. Control system 400 recognizes seeds 146 included in group 148 based on operator input, the detection signals received from sensor 250, a frequency of seeds in the same group, the frequency of groups of seeds, a speed of planter 112, and/or any other operating parameters of planter 112. For example, control system 400 determines detected seeds 146 are in group 148 based on a threshold time between detection signals for each seed 146 in a single group 148. When control system 400 detects a first seed 150 of a group 148, control system 400 starts a timer. If control system 400 receives another detection signal within a threshold time between each seed 146, control system 400 identifies the detection signal as correlating to another seed in the same group 148 as first seed 150. Control system 400 starts a timer and waits for detection signals to identify each seed 146 in group 148. If control system 400 does not receive a detection signal within the threshold time, control system 400 determines that a seed 146 has been omitted from the group 148 and moves on to the next seed 146 in group 148 or to the next group 148.

Control system 400 determines 808 a trigger time based on the detection time of first seed 150, the detection time of last seed 152, or a time between the detection time of first seed 150 and last seed 152. Control system 400 may determine the trigger time based at least in part on an operator input. The operator input may include the number of seeds 146 per group 148 and/or a desired offset of the fluid relative to each group. For example, an operator may input an offset distance that represents a negative offset, a positive offset, or a zero offset as described herein. Control system 400 receives the number of seeds 146 per group 148 and the offset, if any, and determines the trigger time based on the information. For example, if the offset is negative and the fluid band length is less than the absolute value of the offset, control system 400 determines the trigger time based on the detection signal received for the first seed 150 in the group 148. If the offset is greater than zero, control system 400 determines the trigger time based on the detection signal received for the last seed 152 in group 148. For example, if group 148 includes an odd number of seeds 146, control system 400 identifies the median seed 146 and determines the trigger time based on the median seed 146. For example, control system 400 identifies the third seed 146 as the median seed 146 if there are five seeds 146 in group 148. If group 148 includes an even number of seeds 146, control system 400 determines an average detection time based on received detection signals for seeds 146 in the group 148 and determines the trigger time based on the average detection time. In some embodiments, control system 400 determines the average detection time by summing the detection times of the first and last seeds 146 and dividing the summed value by two. In other embodiments, control system 400 determines the average detection time by summing detection times of middle seeds 146 in group 148 and dividing the summed value by the number of middle seeds 146. In further embodiments, control system 400 determines the average detection time by summing detection times of all seeds 146 in group 148 and dividing the summed value by the number of seeds 146 in group 148.

In some embodiments, control system 400 may additionally or alternatively be configured to determine a trigger time based on a user-selected trigger seed. For example, where a group of N seeds is dispensed through seed tube 158, a user may input a numerical value between 1 and N using user interface 406 (shown in FIG. 5) to identify a trigger seed off of which control system 400 determines a trigger time for nozzle assembly 178. Alternatively, a user may identify a trigger seed using graphics displayed on user interface 406, as described above. Accordingly, in some embodiments, an operator may select first seed 150, middle seed 151, or last seed 152 as a trigger seed using user interface 406. Sensor 250 is configured to transmit a detection signal to control system 400 when sensor 250 detects the trigger seed, and control system 400 determines a trigger time based on the detection signal of the trigger seed. In some embodiments, sensor 250 determines which seed is the trigger seed and only transmits a detection signal to control system 400 for the trigger seed. In other embodiments, sensor 250 transmits a detection signal for each detected seed, and control system 400 determines which detection signal corresponds to the user-selected trigger seed based on the timing of the detection signals, the number of seeds detected by sensor 250 in a group, and/or the number of seeds in each group 148.

In other embodiments, control system 400 determines the trigger time based on a fluid band overlap received as an operator input. The fluid band overlap refers to an overlap between the band of fluid dispensed by nozzle assembly 178 and the group 148 of seeds dispensed by seeder assembly 190. In other words, the fluid band overlaps with a group 148 of seeds if the band of fluid extends to a point between the first seed 150 and the last seed 152 in the group 148. If the fluid band does not extend to a point between the first seed 150 and the last seed 152 in the group 148, the fluid band does not overlap with the group 148 of seeds. In some embodiments, control system 400 determines the trigger time based on the detection time of first seed 150 or last seed 152 if the fluid band overlap is approximately zero (i.e., there is substantially no overlap between the fluid band and the group of seeds). Control system 400 determines the trigger time based on the detection time of middle seed 151 if the fluid band overlap is greater than zero. In some embodiments, control system 400 may use an algorithm to identify the middle seed 151. For example, control system 400 may identify the middle seed 151 by summing the number of seeds per group 148, adding one to the sum, and dividing the resulting sum by two. If the calculation returns a decimal value, control system 400 may round the decimal value down to the nearest whole integer to reduce the chance that an omitted or undetected seed will affect the trigger time.

Application system 112 transmits 810 a control signal to nozzle assembly 178 based on the trigger time and the number of seeds 146 per group 148. For example, as described herein, controller 222 and/or the control system of planter 112 may send a pulse width modulated signal to a solenoid valve 182 to control flow of fluid F to nozzle 180. Also as described herein, the control signal may be varied based on various operating parameters of planter 112 and/or operator inputs including, for example without limitation, the vertical distance from the top of seed tube 158 to furrow 138, the vertical distance each seed 146 falls between the sensor 250 and the furrow 138, the vertical distance between an outlet of nozzle assembly 178 (e.g., tip 234, if connected) and furrow 138, a horizontal distance between an outlet of seed tube 158 and an outlet of nozzle assembly 178, an angle at which nozzle assembly 178 is oriented relative to field 102, the speed of row unit 114, and the number of seeds 146 in each group 148. For example, the number of seeds 146 per group 148 may be used to determine the timing of the control signal and/or the amount of fluid to dispense relative to group 148.

Control system 400 may transmit 810 the control signal based on an offset value provided by the operator or otherwise determined/received by control system 400. For example, if the offset is negative and the fluid band length is less than the absolute value of the offset, control system 400 sends a control signal to nozzle assembly 178 based on the detection signal for first seed 150 such that fluid F is applied starting before group and continuing in the direction of travel on or under at least one seed 146 of group 148. If the offset is zero, or, in some embodiments, less than zero and the fluid band length is greater than the absolute value of the offset, control system 400 sends a control signal to nozzle assembly 178 based on the detection time of a middle seed or a determined average detection time such that fluid F is applied on group 148. If the offset is greater than zero, control system 400 sends a control signal to nozzle assembly 178 based on the detection signal for the last seed 152 such that a gap exists between group 148 and fluid F, with fluid F extending from the end of the gap and in the direction of travel.

In addition, control system 400 is configured to determine a trigger time and transmit a control signal if control system 400 does not receive a detection signal for one or more seeds in group 148. For example, each time a detection signal is received from sensor 250, control system 400 determines a provisional trigger time and stores a control signal based on the determined provisional trigger time. Control system 400 may overwrite or update the stored control signal when a detection signal for a subsequent seed 146 is received. If a detection signal is not received within the predetermined time between seeds 146, control system 400 determines that a seed 146 has been omitted from group 148 and proceeds to waiting for the next detection signal if there is another seed in the group, or proceeds with sending the stored provisional control signal to nozzle assembly 178 that is based on the received detection signals. In some embodiments, control system 400 sends the control signal immediately after receiving a detection signal for a seed 146 identified as a trigger seed. For example, if the offset is negative, control system 400 identifies the first seed 150 as the trigger seed and may send the control signal after receiving the detection signal for the first seed without waiting for subsequent detection signals. If the offset is 0 and group 148 includes an odd number of seeds, control system 400 may identify the median seed 146 as the trigger seed and send the control signal immediately after receiving the detection signal for the median seed 146. Alternatively, control system 400 may wait until all detection signals for seeds 146 in group 148 have been received and determine an actual number of seeds 146 in group 148 based on the received detection signals. Accordingly, control system 400 may adjust the control signal and the timing and characteristics of the resulting fluid application based on the actual number of seeds 146 in group 148. Control system 400 is able to make determinations using all detection signals because the time between seeds 146 in group 148 is less than the time that each seed 146 takes to travel from sensor 250 to furrow 138.

Application system 112 applies 812 fluid from nozzle assembly 178 on or adjacent the group 148 of seeds 146 when nozzle assembly 178 receives a control signal from control system 400. In the illustrated embodiment, application system 112 is configured to provide a single discrete spray, i.e., a single shot, per group 148 of seeds 146. Accordingly, system 112 is configured to apply fluid precisely relative to group 148 of seeds 146.

Although seed planting and agricultural fluid application system 112 is described herein with reference to applying fluid to seeds 146, planter 112 may generally be utilized to apply fluid to any suitable type of plant and/or plant precursor, such as seeds, seedlings, transplants, encapsulated tissue cultures and/or any other suitable plant precursors. In some embodiments, planter 112 may not plant seed 146 and/or may not be configured to plant seeds 146, and instead may be configured to apply fluid F on and/or adjacent to existing seeds, plants, or other targets.

Embodiments of the methods and systems described may more efficiently apply fluids to surfaces compared to prior methods and systems. For example, the systems and methods described provide for precise placement of fluid relative to a group of seeds. In addition, the system facilitates determination of a fluid band length and offset distance relative to the group of seeds. Moreover, the system facilitates conveyance of this information to an operator through use of a user interface system.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

When introducing elements of the present invention or the preferred embodiment(s) thereof, the articles "a", "an", "the" and "the" are intended to mean that there are one or more of the elements. The terms "comprising", "including" and "having" are intended to be inclusive and mean that there may be additional elements other than the listed elements. Moreover, the use of "top", "bottom", "above", "below" and variations of these terms is made for convenience, and does not require any particular orientation of the components.

As various changes could be made in the above without departing from the scope of the invention, it is intended that all matter contained in the above description and shown in the accompanying drawings shall be interpreted as illustrative and not in a limiting sense.

What is claimed is:

1. A planter system for planting seeds, the planter system comprising:

a seeder assembly including a seed meter configured to dispense seeds through a seed tube, wherein the seed meter is configured to dispense the seeds as groups of seeds at discrete intervals;

a sensor configured to transmit a first detection signal upon detection of a first seed passing through the seed tube and a second detection signal upon detection of a second seed passing through the seed tube; and a control system communicatively coupled to the sensor to receive the detection signals from the sensor and configured to:

compare a time between the first and second detection signals to a threshold time;

determine that the first seed and the second seed are in a single dispensed group of seeds when the time between the first and second detection signals is less than the threshold time; and determine that the first seed and the second seed are in different dispensed groups of seeds if the time between the first and second detection signals is greater than the threshold time.

2. The planter system of claim 1, wherein the control system is configured to start a timer when the control system receives the first detection signal.

3. The planter system of claim 2, wherein the control system is configured to start a second timer when the control system receives the second detection signal or when the control system determines that a seed has been omitted from a group of seeds.

4. The planter system of claim 1, wherein the control system is configured to determine that a seed has been omitted from a group of seeds when the control system does not receive a detection signal for an expected seed within the threshold time.

5. The planter system of claim 1, wherein the control system is further configured to determine the threshold time based on at least one of an operator input, the detection signals received from the sensor, a frequency of seeds in the same group, a frequency of groups of seeds, or a speed of the planter system.

6. The planter system of claim 1 further comprising a user interface configured to receive input from an operator indicating a number of seeds to be dispensed in each group of seeds.

7. The planter system of claim 1, wherein the control system is further configured to identify a trigger time based on at least one of a detection time of the first seed, a detection time of the second seed, and the time between the first and second detection times, wherein the control system transmits a control signal to a nozzle assembly based on a number of seeds in the group and the trigger time to apply fluid on or adjacent the group of seeds.

8. The planter system of claim 7, wherein the control system is further configured to determine the trigger time based on the second detection signal, and transmit the control signal to the nozzle assembly to apply fluid in front of the group of seeds relative to a travel direction of the planter system.

9. The planter system of claim 7, wherein the control system is further configured to determine the trigger time based on the first detection signal, and transmit the control signal to the nozzle assembly to apply fluid behind the group of seeds relative to a travel direction of the planter system.

10. The planter system of claim 7, wherein the control system is further configured to determine the trigger time based on the time between the first and second detection signals, and transmit the control signal to the nozzle assembly to apply fluid on the group of seeds.

11. The planter system of claim 1, wherein the sensor is configured to transmit a third detection signal upon detection of a third seed passing through the seed tube, wherein the control system is further configured to:

compare a time between the second and third detection signals to the threshold time;

determine that the second seed and the third seed are in a single group of seeds when the time between the second and third detection signals is less than the threshold time; and determine that the second seed and the third seed are in different groups of seeds when the time between the second and third detection signals is greater than the threshold time.

12. A method for planting seeds, the method comprising:

dispensing seeds through a seed tube using a seed meter by dispensing the seeds as groups of seeds at discrete intervals;

detecting, by a sensor, each seed passing through the seed tube;

transmitting a first detection signal to a control system communicatively coupled to the sensor upon detecting, via the sensor, a first seed passing through the seed tube;

transmitting a second detection signal to the control system upon detecting, via the sensor, a second seed passing through the seed tube;

comparing, by the control system, a time between the first and second detection signals to a threshold time;

determining, by the control system, that the first seed and the second seed are in a single group of dispensed seeds when the time between the first and second detection signals is less than the threshold time; and determining, by the control system, that the first seed and the second seed are in different groups of dispensed seeds when the time between the first and second detection signals is greater than the threshold time.

13. The method of claim 12 further comprising starting a timer when the control system receives the first detection signal.

14. The method of claim 13 further comprising, starting a second timer when the control system receives the second detection signal or when the control system determines that a seed has been omitted from a group of seeds.

15. The method of claim 12 further comprising determining that a seed has been omitted from a group when the control system does not receive a detection signal for an expected seed within the threshold time.

16. The method of claim 12 further comprising:

transmitting a third detection signal to the control system upon detection of a third seed passing through the seed tube:

comparing a time between the second and third detection signals to the threshold time between seeds in a single group;

recognizing that the second seed and the third seed are in a single group if the time between the second and third detection signals is within the threshold time; and recognizing that the second seed and the third seed are in different groups if the time between the second and third detection signals is greater than the threshold time.

17. A control system for a planter system for planting seeds, the control system comprising at least one processor and memory having computer-executable instructions embodied thereon, which, when executed by the at least one processor, cause the control system to:

cause a seed meter to dispense the seeds as groups of seeds at discrete intervals through a seed tube;

receive a first detection signal from a sensor upon detection of a first seed passing through the seed tube;

receive a second detection signal from the sensor upon detection of a second seed passing through the seed tube;

compare a time between the first and second detection signals to a threshold time;

determine that the first seed and the second seed are in a single dispensed group of seeds if the time between the first and second detection signals is less than the threshold time; and determine that the first seed and the second seed are in different dispensed groups of seeds when the time between the first and second detection signals is greater than the threshold time.

18. The control system of claim 17, wherein the computer-executable instructions, when executed by the at least one processor, further cause the control system to start a timer when the control system receives the first detection signal.

19. The control system of claim 18, wherein the computer-executable instructions, when executed by the at least one processor, further cause, when the control system receives the second detection signal or when the control system determines that a seed has been omitted from a group of seeds, the control system to start a second timer.

20. The control system of claim 17, wherein the computer-executable instructions, when executed by the at least one processor, further cause the control system to determine that a seed has been omitted from a group if the control system does not receive a detection signal for an expected seed within the threshold time.

* * * * *